United States Patent
Agarwal

(10) Patent No.: US 12,141,136 B2
(45) Date of Patent: Nov. 12, 2024

(54) SYSTEMS AND METHODS FOR LOW-LATENCY PROVISION OF CONTENT

(71) Applicant: GOOGLE LLC, Mountain View, CA (US)

(72) Inventor: Ayush Agarwal, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 6 days.

(21) Appl. No.: 16/758,645

(22) PCT Filed: Dec. 5, 2019

(86) PCT No.: PCT/US2019/064750
§ 371 (c)(1),
(2) Date: Jan. 24, 2022

(87) PCT Pub. No.: WO2021/112861
PCT Pub. Date: Jun. 10, 2021

(65) Prior Publication Data
US 2021/0406253 A1 Dec. 30, 2021

(51) Int. Cl.
*G06F 16/245* (2019.01)
*G06F 16/248* (2019.01)
(Continued)

(52) U.S. Cl.
CPC .......... *G06F 16/245* (2019.01); *G06F 16/248* (2019.01); *G06F 16/29* (2019.01); *H04L 67/60* (2022.05); *H04W 64/00* (2013.01)

(58) Field of Classification Search
CPC ...... G06F 16/245; G06F 16/248; G06F 16/29; H04L 67/60; H04W 64/00
See application file for complete search history.

(56) References Cited

U.S. PATENT DOCUMENTS 8,671,106 B1 * 3/2014 Lee .................. G06F 16/951
707/767
9,195,703 B1 11/2015 Kirmse et al.
(Continued)

FOREIGN PATENT DOCUMENTS

WO WO-2013/192583 A1 12/2013

OTHER PUBLICATIONS

International Search Report and Written Opinion for PCT Appln. Ser. No. PCT/US2019/064750 dated Sep. 23, 2020 (16 pages).

*Primary Examiner* — Alicia M Willoughby
(74) *Attorney, Agent, or Firm* — MARSHALL, GERSTEIN & BORUN LLP

(57) ABSTRACT

The present disclosure provides systems and methods for low-latency provision of content. The method includes receiving one or more signals indicating a current location of a client device; before receiving an input query from a map application of the client device, retrieving characteristics of the client device; and generating a set of identifications, the set of identifications including the current location of the client device, and the characteristics of the client device. The method further includes determining that a query prediction exceeds a threshold; responsive to the determination that the query prediction exceeds the threshold, selecting a link to a geographic location of an entity that is associated with the query prediction; and, responsive to a selection of a map application on the client device by a user, transmitting the selected link to the client device before receiving a query from the user of the client device.

14 Claims, 8 Drawing Sheets

(51) Int. Cl.
*G06F 16/29* (2019.01)
*H04L 67/60* (2022.01)
*H04W 64/00* (2009.01)

(56) References Cited

U.S. PATENT DOCUMENTS

| | | | |
|---|---|---|---|
| 9,277,365 B1* | 3/2016 | Wilden | H04L 67/02 |
| 9,367,589 B1* | 6/2016 | Swietlicka | G06F 16/24 |
| 9,384,266 B1* | 7/2016 | Leicht | H04W 4/14 |
| 11,514,500 B2* | 11/2022 | Deak | H04W 4/029 |
| 2013/0055097 A1* | 2/2013 | Soroca | G06Q 30/0246 |
| | | | 715/738 |
| 2015/0006290 A1* | 1/2015 | Tomkins | G06Q 30/0256 |
| | | | 705/14.54 |
| 2016/0027305 A1* | 1/2016 | Inaba | G08G 1/0112 |
| | | | 340/905 |
| 2016/0063058 A1* | 3/2016 | Spehr | G06F 16/248 |
| | | | 707/770 |
| 2016/0350383 A1* | 12/2016 | Lim | G06F 16/29 |
| 2016/0357808 A1* | 12/2016 | Morris | G06F 9/453 |
| 2017/0011130 A1* | 1/2017 | Reese | G06F 16/24 |
| 2017/0357465 A1* | 12/2017 | Dzeryn | G06F 3/0647 |
| 2017/0359695 A1* | 12/2017 | Aerts | G01C 21/362 |
| 2018/0188058 A1* | 7/2018 | Dabholkar | G01C 21/3617 |
| 2018/0188924 A1* | 7/2018 | Kumar | G06F 3/0481 |
| 2018/0349489 A1* | 12/2018 | Toudji | G06F 16/285 |
| 2019/0050392 A1* | 2/2019 | Clements | G06F 3/04886 |
| 2019/0095786 A1* | 3/2019 | Carbune | G06Q 30/0202 |
| 2020/0145310 A1* | 5/2020 | Lodhia | H04L 67/568 |
| 2020/0408550 A1* | 12/2020 | Gupta | G01C 21/3476 |
| 2021/0043086 A1* | 2/2021 | Chen | G06N 5/01 |

* cited by examiner

SYSTEMS AND METHODS FOR LOW-LATENCY PROVISION OF CONTENT

CROSS-REFERENCE TO RELATED APPLICATIONS

The present application is a National Stage Application, filed under 35 U.S.C. 371, of International Patent Application No. PCT/US2019/64750 filed on Dec. 5, 2019 titled "SYSTEMS AND METHODS FOR LOW-LATENCY PROVISION OF CONTENT," the entirety of which is incorporated by reference herein.

BACKGROUND

People may use map applications on their client device to obtain directions to various brick and mortar stores or entertainment locations. While the people access the map applications, third parties, such as content providers, associated with the current locations of the people using the map applications may provide content such as links that provide directions to their stores or entertainment locations to the people. Consequently, the people can easily see which stores are in their area. The third parties may determine and provide the content responsive to a signal from a client device indicating that a user is accessing a map application and has typed in a query. The third parties may select content to provide to users based on the query. Unfortunately, to determine which content to provide a server may perform a large amount of processing. Such processing may cause a large amount of latency in combination with the time it takes for the client device to generate and transmit a request for content including the query. The server may process the query, identify relevant content, and transmit content back to the client device. This process may take time and cause the client device to retrieve and display such content slowly.

SUMMARY

The systems and methods performed herein provide for low-latency transmission of content. Machine learning models may be implemented by a server to predict whether a user will select a map application on a client device and data associated with the client device may be used to predict search queries that a user would make if the user were to select the map application or otherwise input a query. The data about the client device may include various location information and previous search queries that the user has performed via the map application or other applications on the client device. The server may predict search queries for the user before receiving any search queries from a user input. The server may use the predicted search queries to obtain links to various geographic locations to which a user may wish to travel. The server may store the links so they are ready to transmit to the client device upon receiving an indication that client device is executing the map application. In some implementations, the server may preemptively transmit the link to the client device to be stored in a cache of the client device so when a user selects the map application the client device can retrieve and render the link on a user interface of the client device before the client device transmits any requests for content or otherwise receives a query input. Advantageously, by selecting and/or transmitting links to the client device before the user inputs a query input, the server may provide links to client devices faster with less latency than traditional techniques. Traditional techniques often rely processing device information to provide content after users have input search queries into map applications.

In an aspect described herein, a method for low-latency provision of content is described. The method may comprise receiving, by a server from a client device, one or more signals indicating a current location of the client device; before receiving an input query from a map application of the client device, retrieving, by the server from a database, characteristics of the client device; and generating, by the server, a set of identifications, the set of identifications comprising the current location of the client device, and the characteristics of the client device. The method may further comprise determining, by the server, that a query prediction exceeds a threshold; responsive to the determination that the query prediction exceeds the threshold, selecting, by the server, a link to a geographic location of an entity that is associated with the query prediction; and responsive to a selection of a map application on the client device by a user, transmitting, by the server, the selected link to the client device before receiving a query from the user of the client device.

In some implementations, the set of identifications may further comprise previous locations of the client device and timestamps associated with the previous locations and the current location. The method may further comprise comparing, by the server, a first timestamp and a first previous location with a second timestamp and current location; and determining, by the server, a traveling speed based on the comparison. In some implementations, determining that the query prediction exceeds the threshold may be performed at least in part responsive to the determined traveling speed.

In some implementations, the method may further comprise comparing, by the server, a third timestamp and a third previous location with a fourth timestamp and the current location; determining, by the server, that the user has not moved within a time period based on the comparison. In some implementations, determining that the query prediction exceeds the threshold may be performed at least in part responsive to the determination that the user has not moved within the time period.

In some implementations, the characteristics comprise previously visited locations, previous searches, previous inputs corresponding to selection of a link to a geographic location, timestamps associated with the previous searches, a current time of day, or one or more queries associated with other client devices within a time period.

In some implementations, determining that the query prediction exceeds the threshold may further comprise identifying that a correlation between one or more previous characteristics and one or more current characteristics exceeds a second threshold.

In some implementations, the method may further comprise receiving a user selection of the selected link; and increasing a prediction score associated with the selected link, responsive to receipt of the user selection of the selected link. The query prediction may be proportional to the prediction score associated with the selected link.

In another aspect described herein, system for low-latency provision of content is described. A server may comprise a network interface in communication with a client device and a processor. The network interface may be configured to receive, from the client device, one or more signals indicating a current location of the client device. The processor may be configured to, before receiving an input query from a map application, retrieve, from a database, characteristics of the client device; generate a set of identifications, the set of identifications comprising the current location of the client device and the characteristics of the client device; determine that a query prediction exceeds a threshold; and responsive to the determination that the query prediction exceeds the threshold, select a link to a geographic location of an entity that may be associated with the query prediction. The network interface may be further configured to transmit the selected link to the client device before receiving a query from the user of the client device responsive to a selection of the map application on the client device by a user. In some implementations, the set of identifications may further comprise previous locations of the client device and timestamps associated with the previous locations and the current location.

In some implementations, the processor may be further configured to compare a first timestamp and a first previous location with a second timestamp and current location, and determine a traveling speed based on the comparison. Determining that the query prediction exceeds the threshold may be performed at least in part responsive to the determined traveling speed.

In some implementations, the processor may be further configured to compare a third timestamp and a third previous location with a fourth timestamp and the current location, and determine that the user has not moved within a time period based on the comparison. Determining that the query prediction exceeds the threshold may be performed at least in part responsive to the determination that the user has not moved within the time period.

In some implementations, the characteristics comprise previously visited locations, previous searches, previous inputs corresponding to selection of a link, timestamps associated with the previous searches, a current time of day, or one or more queries associated with other client devices within a time period. The processor may further be configured to identify that a correlation between one or more previous characteristics and one or more current characteristics exceeds a second threshold.

In some implementations, the processor may be further configured to receive a user selection of the selected link, and increase a prediction score associated with the selected link, responsive to receipt of the user selection of the selected link. The query prediction may be proportional to the prediction score associated with the selected link.

In another aspect, a method for low-latency provision of content is described. The method may comprise transmitting, by a client device to a server, one or more signals indicating a current location of the client device; executing a map application, by a client device, responsive to a selection of the map application by a user; and transmitting, by the client device to a server, one or more signals indicating the selection of the map application, responsive to executing the map application. The method may further comprise receiving, by the client device from the server and prior to receipt of an input query from a user of the client device, an identification of a link to a geographic location of an entity selected by the server responsive to a determination that a query prediction, based on characteristics of the client device and the current location of the client device, exceeds a threshold; and displaying, by the client device, the link to the geographic location of the entity within the map application.

In some implementations, the characteristics of the client device comprise a movement speed of the client device, previously visited locations, previous searches, previous inputs corresponding to selection of a link, or timestamps associated with the previous searches. The query prediction may further be based on a correlation between the characteristics of the client device and one or more of a current location of the device and a current time of day. In some implementations, the query prediction may be further based on a current time of day or one or more queries associated with other client devices.

In some implementations, the method may further comprise receiving, by the client device via the map application, a user selection of the received link; and transmitting, by the client device to the server, an indication of the user selection, the server increasing a prediction score associated with the selected link. The query prediction may be proportional to the prediction score associated with the selected link.

In another aspect a method for low-latency provision of content is described. The method may comprise transmitting, from a client device and to a server, one or more signals indicating a current location of the client device; receiving, by the client device and from the server prior to receipt of a user selection of a map application, an identification of a link to a geographic location of an entity selected by the server; executing, by the client device, the map application responsive to a selection of the map application by the user; and displaying, by the client device, the link to a geographic location of an entity within the map application. In some implementations, the server may select the identification of the link to the geographic location of the entity responsive to a determination that a query prediction, based on characteristics of the client device and the current location of the client device, exceeds a threshold.

In some implementations, the characteristics of the client device may comprise a movement speed of the client device, previously visited locations, previous searches, previous inputs corresponding to selection of a link, or timestamps associated with the previous searches. The query prediction may further be based on a correlation between the characteristics of the client device and one or more of a current location of the device and a current time of day. The characteristics may further comprise previously visited locations, previous searches, previous inputs corresponding to selection of a link to a geographic location, timestamps associated with the previous searches, a current time of day, or one or more queries associated with other client devices within a time period. In some implementations, determining that the query prediction exceeds the threshold further may comprise identifying that a correlation between one or more previous characteristics and one or more current characteristics exceeds a second threshold.

In some implementations, the method may further comprise receiving a user selection of the selected link; and increasing a prediction score associated with the selected link, responsive to receipt of the user selection of the selected link. The query prediction may be proportional to the prediction score associated with the selected link.

In another aspect described herein, a method for low-latency provision of content is described. The method may comprise receiving, by a server and from a client device, one or more signals indicating a current location of the client device; retrieving, by the server from a database, characteristics of the client device; generating, by the server, a set of identifications, the set of identifications comprising the current location of the client device and the characteristics of the client device; and determining, by the server, that a launch application state exceeds a threshold; responsive to the determination that the launch application state exceeds the threshold, determining, by the server, that a query prediction exceeds a second threshold. The method may further comprise, responsive to the determination that the query prediction exceeds the second threshold, selecting a link to a geographic location of an entity that may be associated with the query prediction; and transmitting the selected link to the client device prior to receiving an indication that a user selected a map application.

In some implementations, the set of identifications may further comprise previous locations of the client device and timestamps associated with the previous locations and the current location. The method may further comprise comparing a first timestamp and a first previous location with a second timestamp and current location; and determining a traveling speed based on the comparison. Determining that the query prediction exceeds the threshold may be performed at least in part responsive to the determined traveling speed.

In some implementations, the method may further comprise comparing a third timestamp and a third previous location with a fourth timestamp and the current location; and determining that the user has not moved within a time period based on the comparison. Determining that the query prediction exceeds the threshold may be performed at least in part responsive to the determination that the user has not moved within the time period.

In some implementations, the characteristics comprise previously visited locations, previous searches, previous inputs corresponding to selection of a link to a geographic location, timestamps associated with the previous searches, a current time of day, or one or more queries associated with other client devices. Determining that the query prediction exceeds the threshold further may comprise identifying that a correlation between one or more previous characteristics and one or more current characteristics exceeds a third threshold.

In some implementations, the method may further comprise receiving a user selection of the selected link; and increasing a prediction score associated with the selected link, responsive to receipt of the user selection of the selected link. The query prediction may be proportional to the prediction score associated with the selected link.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

As users access map applications, various client devices may display content to the users so the users may more easily view locations that they can visit and that are relevant to them. To display such content, the client devices often wait for a user to select the map application and input a query before being able to provide any relevant content. Such a process can take a substantial amount of time as the map application may need to load, present a form to provide for user input, and await such a user input. Once the map application receives the input, the map application may generate a request for content and transmit the request to a server. The server may receive the request, determine which content to provide to the client device (e.g., by sending the input query to various content servers), and transmit the content back to the requesting client device. Each of these steps may take time as the client device and the intermediary server process data and transmit messages back forth.

Figure 1:
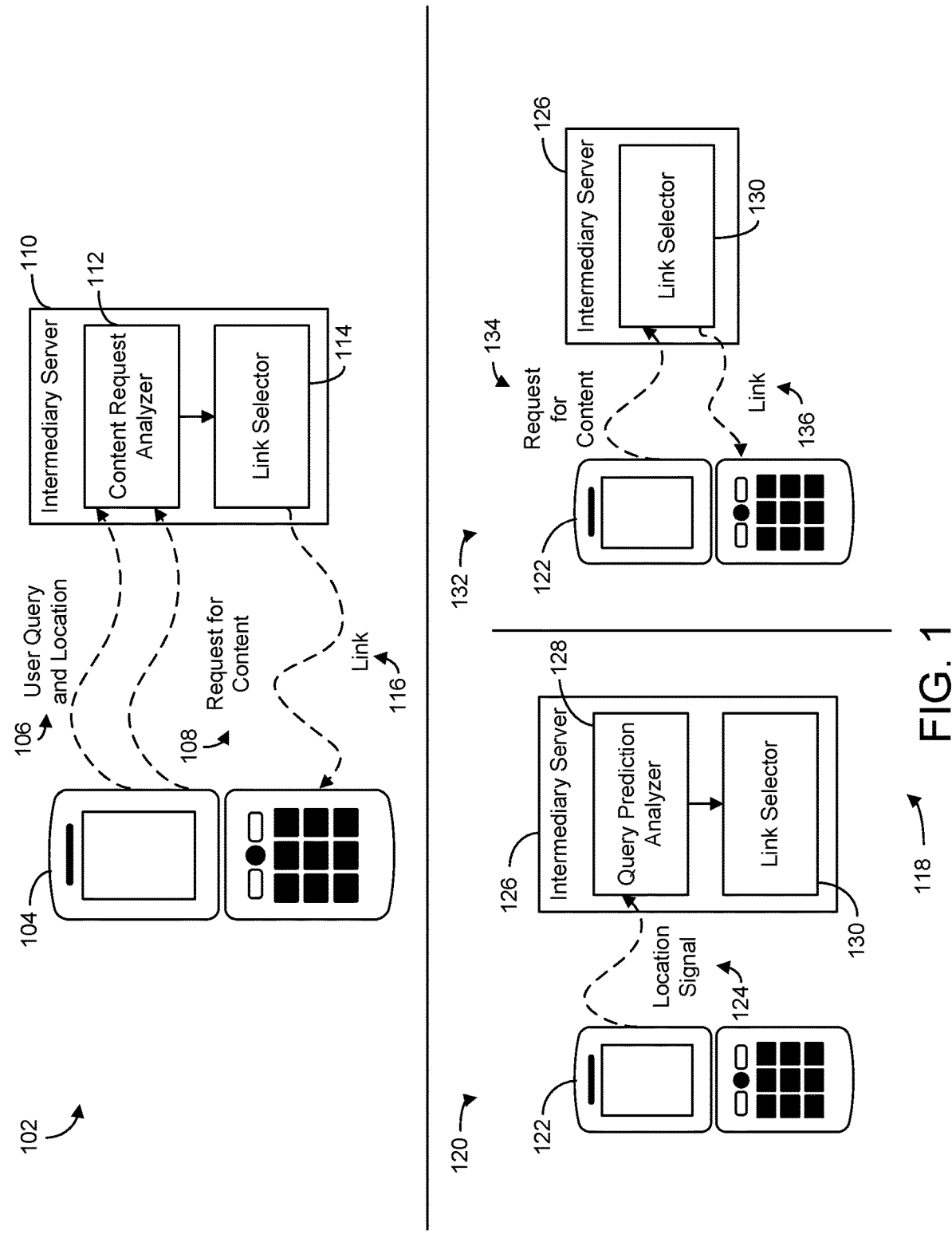
FIG. 1 is a block diagram of two sequences, each sequence including a mobile device requesting content from an intermediary server, according to some implementations.

For example, referring first to FIG. 1, illustrated is a block diagram of two sequences 102 and 118, each sequence 102 and 118 including a client device requesting content from an intermediary server, according to some implementations. Sequence 102 may be a sequence including a client device 104 in communication with an intermediary server 110. Client device 104 may execute a map application that may display a current location of client device 104 and provide directions to various geographic locations in the surrounding area of client device 104. To obtain any relevant content (e.g., links to a geographic location of an entity), client device 104 may execute the map application, receive a query input from a user, and transmit the query input to intermediary server 110. In turn, intermediary server 110 may identify relevant content based at least on the query input, the current location of the client device, and characteristics of the client device and transmit the relevant content to client device 104. In contrast, sequence 120 may be a sequence of another client device 122 that periodically transmits location information to an intermediary server 126. Intermediary server 126 may use this location information along with other characteristics about client device 122 to identify content to transmit to client device 122 before or upon receiving a signal indicating a map application has been selected. When client device 122 sends a request for content to intermediary server 126, intermediary server 126 may transmit the pre-selected content back to client device 122.

At sequence 102, a user may access a map application on client device 104. Upon accessing the map application, the user may type in a query in a query form associated with the map application. When the user types in the query, client device 104 may send a request for content 108 to intermediary server 110. With the request for content, client device 104 may transmit one or more signals 106 indicating the query and/or the current location of client device 104 to intermediary server 110. Upon receiving the request for content and via a content request analyzer 112, intermediary server 110 may process the request and transmit the query to content servers to determine which content server may associate the highest value with the query. Link selector 114 may receive a link to a geographic location of an entity associated with the highest value from the content servers and transmit the link to client device 104.

Conversely, sequence 118 illustrates an example sequence of a client device 122 sending a similar request for content 134 to an intermediary server 126. In sequence 118, however, intermediary server 126 may have already selected a link to a geographic location of an entity to provide to client device 122. Consequently, intermediary server 126 may transmit a signal 136 including the pre-selected link back to client device 122 without performing any processing. Sequence 118 may include phases that enable the pre-selection and consequentially the low-latency transmission of content. In a first phase 120, client device 122 may periodically transmit location signals 124 to intermediary server 126. Intermediary server 126 may receive such location information and, via query prediction analyzer 128, predict a query that a user may make using a map application of client device 122. To make the prediction, query prediction analyzer 128 may identify the current location and other characteristics of client device 122 and determine a query prediction. A link selector 130 may use the query prediction to select a link to provide to client device 122.

In a second phase 120, a user may select the map application on client device 122. Upon receiving the selection, client device 122 may execute the map application and transmit a signal 124 including a request for content to intermediary server 126. Intermediary server 126 may receive the selection and identify the previously identified link. Intermediary server 126 may send a signal 136 including the previously identified link back to client device 122 without taking any time to perform any extra processing.

In another implementation, intermediary server 126 may periodically predict whether a user will likely launch a map application on client device 122 within a predetermined time period. Intermediary server 126 may make such a prediction using current location and characteristic information about client device 122. If intermediary server 126 predicts that a user will likely launch the map application, intermediary server 126 may preemptively predict a query via query prediction analyzer 128 and select a link via link selector 130. Intermediary server 126 may then transmit the selected link back to client device 122 prior to receiving any indication that the user selected the map application. Client device 122 may store the content in a cache. Consequently, when the user selects the map application, the client device 122 may retrieve the content from the cache and display it to the user via a user interface without taking time to request content from intermediary server 126.

Advantageously, as represented in sequence 120, because intermediary server 126 can pre-select content to provide to client device 122, intermediary server 126 may provide content to client device 122 with reduced latency compared to other methods. As exemplified with sequence 102, other methods may involve an intermediary server processing and selecting content in response to receiving a request for content. By implementing sequence 120, intermediary server 126 may select and, in some cases, provide content to client device 122 before the user selects a map application and/or provides any other input. Consequently, upon receiving a selection of the map application from a user, client device 122 may display such content without waiting for intermediary server 126 to process any information.

Figure 2:
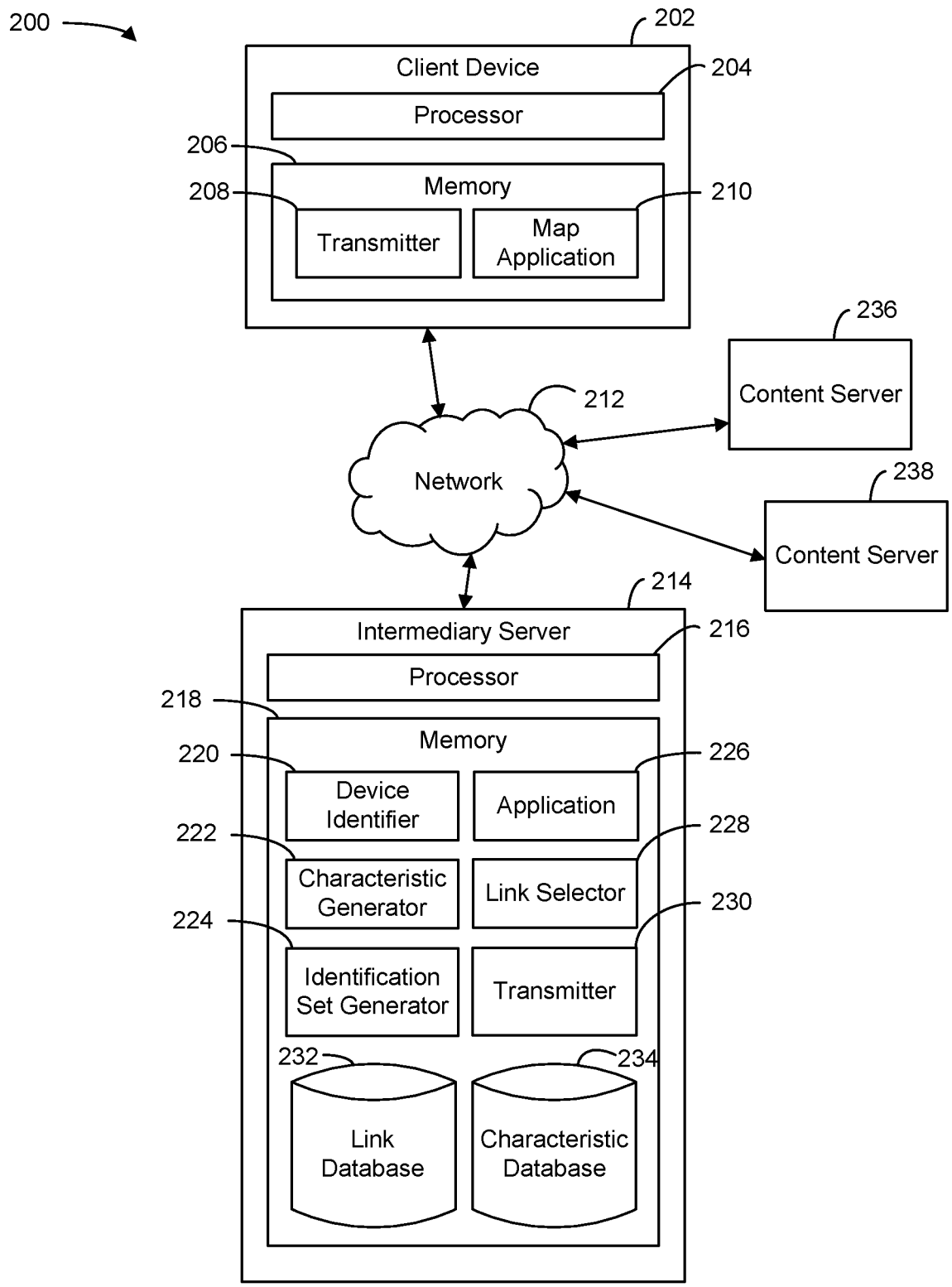
FIG. 2 is a block diagram of an implementation of a system for low-latency provision of content, according to some implementations.

For example, referring now to FIG. 2, an implementation of a system 200 for low-latency provision of content is shown, according to some implementations. System 200 is shown to include a client device 202, a network 212, an intermediary server 214, and content servers 236 and 238. Client device 202 may access the Internet via network 212. Network 212 can include synchronous or asynchronous networks. Client device 202 may periodically transmit location signals to intermediary server 214 (e.g., via GPS, cell tower location, etc.). Intermediary server 214 may receive such signals and store them as characteristics of the client device 202. Client device 202 may also send signals to intermediary server 214 indicating that the map application is being accessed by a user. Intermediary server 214 may transmit content to client device 202 such as links associated with geographic locations of entities that may be relevant to client device 202 based on the current location of client device 202 and such characteristics. Depending on the configuration, intermediary server 214 may transmit the content to client device 202 before the user selects the map application to access it or upon receiving an indication that the user has selected the map application.

Client device 202 may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Client device(s) may be referred to variously as a client, device, client device, user device, computing device, anonymized computing device or any other such term. Client device(s) may receive data via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

Client device 202 may comprise one or more client devices configured to periodically transmit location signals to intermediary server 214 and execute a map application that may provide directions to various locations to a user. Client device 202 is shown to include a processor 204 and memory 206, in some implementations. One or more components within client device 202 can facilitate communication between each component within client device 202 and external components such as intermediary server 214 and other servers (not shown). Client device 202 may communicate with any device.

Processor 204 may comprise one or more processors configured to perform instructions on modules and/or components in memory 206 within client device 202, in some implementations. Memory 206 is shown to include a transmitter 208 and a map application 210, in some implementations. Memory 206 may include any number of components. By executing the instructions on modules in memory 206 to perform the operations of each component 208 and 210, processor 204 can enable intermediary server 214 to provide content (e.g., a link to a geographic location of an entity) to client device 202 before a user provides an input into a query form associated with map application 210.

Map application 210 may comprise an application, server, service, daemon, routine, or other executable logic to generate a map of a current location of a user and provide directions to various geographic locations of entities around the area. A user may select map application 210 to view an interface including a current location of the user and various identifications of entities on a map. The user may create a profile on map application 210 and view various attractions in the surrounding area. For example, a user located in San Diego may view various ocean-side attractions such as sea-side restaurants or locations for surfing lessons via map application 210. The user may also rate and explore various entities via map application 210. For example, map application 210 may provide options of entities to explore in various groupings such as restaurants, coffee shops, attractions, gas, parks, hotels, etc. A user may select on any of these groupings to obtain directions to a location of an associated entity.

The user may also input a query into a form of map application 210. The query may be a search for a specific location or entity or a search for an entity type. For example, the user may input a query to obtain directions to ACME, Inc. Based on the query, map application 210 may search a database (e.g., a local database or a cloud database such as a database stored on intermediary server 214) and obtain directions to ACME, Inc. and provide an interface showing such directions. The user may travel to ACME, Inc. following the directions. In some implementations, map application 210 may determine a quickest route based on current traffic data and update in real-time to ensure the user gets to ACME, Inc. as fast as possible. Map application 210 may also update the route if the user makes a wrong turn or otherwise takes a detour. Map application 210 may provide routes to any location. In some implementations, the user may query for general topics such as "hamburgers." Map application 210 may identify the query and obtain links to a variety of different restaurants that serve hamburgers that are close to the user. The user may select one of the links to view directions to a desired restaurant as described above.

In some implementations, upon receiving a user selection of map application 210, client device 202 may execute map application 210. In turn, map application 210 may cause transmitter 208 to transmit a current location signal to intermediary server 214 indicating a current location of client device 202. Map application 210 may also cause transmitter 208 to transmit a request for content (e.g., a link to a geographic location of an entity) upon being executed. As described below, transmitter 208 may transmit the request and receive a link from intermediary server 214 before the user inputs any query into map application 210. Client device 202 may receive the link after intermediary server 214 generates a query prediction that a user would likely make and selects the link based on the query prediction, as described below. Upon receiving the link, map application 210 may display the link at a user interface. The user may select the link to view the associated directions to the geographic location of the entity.

In some implementations, client device 202 may receive links to geographic locations of entities prior to transmitting any requests for content or otherwise indicating that the user selected map application 210. For example, client device 202 may periodically transmit location signals to intermediary server 214. For each of a portion of these location signals, intermediary server 214 may predict whether a user will select map application 210 soon (e.g., within one second, five seconds, 30 seconds, one minute, five minutes, etc.). Intermediary server 214 may make such predictions until intermediary server 214 determines that the user will likely select map application 210 soon. Once intermediary server 214 makes such a determination, intermediary server 214 may generate a query prediction and select a link based on the query prediction. Intermediary server 214 may transmit the link to client device 202. Client device 202 may receive the link and store it in a cache or otherwise in memory of client device 202. Consequently, when the user selects map application 210, map application 210 may retrieve the link from the cache or memory of client device 202 to display it to the user. If the user does not select map application 210 as intermediary server 214 predicted, client device 202 may discard (e.g., erase or remove) the link from its cache or memory.

Transmitter 208 may comprise an application, server, service, daemon, routine, or other executable logic to transmit current location information and/or indications that a user selected map application 210 to intermediary server 214. Transmitter 208 may be configured to periodically transmit signals indicating the current location of client device 202 to intermediary server 214. Transmitter 208 may transmit the signals based on map application 210 operating in the background or automatically regardless of whether map application 210 is operating. Transmitter 208 may also transmit current location information to intermediary server 214 automatically when a user selects map application 210 to execute it. In the current location signals, transmitter 208 may include a device identifier so intermediary server 214 may identify which device sent the location signal.

Through transmitter 208, Client device 202 may transmit its location information to intermediary server 214 via GPS or via information about the cell phone tower with which client device 202 is in communication. In some implementations, client device 202 may transmit location data to another device (e.g., a satellite or another server) which in turn transmits the location information to intermediary server 214. Client device 202 may transmit its location information through any means.

In some implementations, transmitter 208 may also transmit signals to intermediary server 214 indicating that a user selected map application 210. With such signals, transmitter 208 may transmit a request for content (e.g., a link to a geographic location of an entity). In response, transmitter 208 may receive content to be displayed via map application 210. In some implementations, transmitter 208 may receive such content without sending any requests and prior to a user selecting map application 210.

Intermediary server 214 may comprise one or more servers or processors configured for low latency provision of content, in some implementations. Intermediary server 214 is shown to include a processor 216 and memory 218, in some implementations. In brief overview, through processor 216, intermediary server 214 can be configured to obtain and store data (e.g., location information) related to various client devices (e.g., client device 202), receive a current location signal from client device 202, generate a set of identifications using characteristics and the current location of client device 202, use the set of identifications to predict a query of a user before the user provides any input, select a link associated with the predicted query, and transmit an identification of the link to client device 202. One or more components within intermediary server 214 can facilitate communication between each component within intermediary server 214 and external components such as client device 202. Intermediary server 214 can include multiple connected devices (e.g., as a server bank, a group of blade servers, or a multi-processor system), each device can provide portions of the necessary operations.

Processor 216 may comprise one or more processors configured to perform instructions on modules or components in memory 218 within intermediary server 214, in some implementations. In some implementations, processor 216 may execute modules within memory 218. Memory 218 is shown to include a device identifier 220, a characteristic generator 222, an identification set generator 224, an application 226, a link selector 228, a transmitter 230, a link database 232, and a characteristic database 234, in some implementations. In some implementations, processor 216 may comprise or may communicate with a co-processor, such as a tensor processing unit (TPU) that is solely dedicated to using machine learning techniques to determine whether a user will soon select map application 210 on client device 202 and/or predict queries that the user may input into map application 210.

Memory 218 is shown to include device identifier 220. Device identifier 220 may comprise an application, server, service, daemon, routine, or other executable logic to identify which device is sending location signals and/or requesting content from intermediary server 214, in some implementations. Device identifier 220 may periodically receive location information from client devices, identify which client device sent the location information, and store the location information in characteristic database 234. Device identifier 220 may receive the location information by actively polling the client devices or automatically as client device 202 sends it. Device identifier 220 may periodically poll client devices at set intervals (as determined by an administrator) or at various points in time to determine their location. Conversely, the client devices may periodically transmit their current location at set intervals or at various points in time, in some cases as a result of map application 210 executing in the background. In some implementations, the client devices may automatically send their location information to intermediary server 214 at each instant that a user selects a map application on a respective client device. For example, if a user selects map application 210 on client device 202, client device 202 may automatically transmit a location signal indicating a current location of client device 202 and, in some cases, a signal indicating that map application 210 has been selected to intermediary server 214.

Device identifier 220 may receive the location signal and the signal indicating that map application 210 has been selected and update and identify which client device transmitted the signals. Device identifier 220 may identify the client device based on a device identifier or another identifier (e.g., an IP address or a MAC address) that is associated with the signal. Device identifier 220 may receive the location signal and, in some cases, the signal indicating that a user selected a map application, and store them in characteristic database 234. Both signals may be stored as characteristics that identification set generator 224 may retrieve to generate a set of identifications when predicting a query for an associated client device.

Memory 218 is also shown to include characteristic database 234, in some implementations. Characteristic database 234 can be a dynamic database including characteristics of client devices for which intermediary server 214 has collected data. Characteristic database 234 can be a graph database, MySQL, Oracle, Microsoft SQL, PostgreSql, DB2, document store, search engine, key-value store, etc. Characteristic database 234 can be configured to hold any amount of data and can be made up of any number of components. The characteristics may include location data, previously visited locations, previous queries, previous inputs corresponding to selection of a link to a geographic location, entities associated with previous locations, timestamps associated with the previous searches, etc. In some implementations, the characteristics may also include information about client device 202 that is related to browser activity of client device 202 such as web pages visited, domains visited, and previous searches performed on the Internet. Characteristic database 234 may include any type of information about client device 202. In some implementations, characteristic database 234 may be formatted as a look-up table where characteristics are individually associated with their respective device. Device identifier 220 may store characteristics in characteristic database 234 by identifying corresponding device identifiers in characteristic database 234. Further, identification set generator 224 may generate sets of identifications using characteristics of the client device based on their association within the look-up table. Information may be added or removed from characteristic database 234 at any time.

Memory 218 is shown to include characteristic generator 222. Characteristic generator 222 may comprise an application, server, service, daemon, routine, or other executable logic to generate characteristics and add them to characteristic database 234 and/or provide them to identification set generator 224, in some implementations. Characteristic generator 222 may generate characteristics of client device 202 based on the current location of client device 202 and characteristics that are already stored in characteristic database 234. For example, characteristic database 234 may include a previous location of client device 202 along with a timestamp indicating a time that client device 202 was in the previous location. Device identifier 220 may receive a current location signal of client device 202 and identify a timestamp indicating a time that client device 202 sent the current location signal and/or a time that intermediary server 214 received the signal. Characteristic generator 222 may compare the timestamps and the current locations to determine a traveling speed of client device 202. Identification set generator 224 may use the traveling speed as an identification in an identification set.

Further, characteristic generator 222 may compare the traveling speed to a threshold to determine whether the client device is moving and/or, in some implementations, a mode of travel of client device 202. For example, characteristic generator 222 may compare the traveling speed to a threshold of three mph to determine if a person is walking or otherwise moving. If characteristic generator 222 determines that the traveling speed exceeds the threshold, characteristic generator 222 may determine the client device is moving. In some implementations, characteristic generator 222 may use such thresholds to determine a type of movement of the client device. For example, characteristic generator 222 may compare the traveling speed to a threshold of 30 mph to determine if client device 202 is moving in a car, a threshold of 15 mph to determine if client device 202 is moving on a bicycle, a threshold of seven mph to determine if client device 202 is traveling with someone that is running, etc. Each threshold may be any amount and may be associated with any mode of transportation. Further, characteristic generator 222 may compare the traveling speed to any threshold. In some implementations, characteristic generator 222 may compare the traveling speed to each threshold and determine that client device 202 is traveling in the mode of transportation associated with the highest threshold. Characteristic generator 222 may determine the mode of transportation and provide it to identification set generator 224 to use in the set of identifications.

If characteristic generator 222 determines client device 202 is traveling by way of a car, characteristic generator 222 may use the speed and/or the current location of the client device to determine more characteristics of client device 202. For example, characteristic generator 222 may determine client device 202 is traveling on the interstate based on a traveling speed exceeding a threshold (e.g., 70 mph). Characteristic generator 222 may also determine client device 202 is traveling on local roads based on a traveling speed being less than a threshold (e.g., 40 mph). Any threshold may be used to determine such characteristics. Characteristic generator 222 may provide these characteristics to identification set generator 224 to use in the set of identifications.

In some implementations, characteristic generator 222 may determine that client device 202 is staying in the same location. Characteristic generator 222 may do so based on a traveling speed being less than a threshold and/or determining that client device 202 has not left an area having a predetermined radius within a specific time period. Characteristic generator 222 may make such determinations by comparing the location information and associated timestamps to each other between different locations. Characteristic generator 222 may provide a characteristic indicating that client device 202 is staying in the same location to identification set generator 224 to use in the set of identifications. In some implementations, characteristic generator 222 may store any generated characteristics in characteristic database 234.

Memory 218 is shown to include identification set generator 224. Identification set generator 224 may comprise an application, server, service, daemon, routine, or other executable logic to generate a set of identifications to use as an input into one or more machine learning models of application 226, as described below, in some implementations. The set of identifications may be a feature vector. Identification set generator 224 may generate the set of identifications using the current location of client device 202, characteristics stored in characteristic database 234, characteristics generated by characteristic generator 222, and/or, in some cases, characteristics associated with other client devices. Identification set generator 224 may generate the set of identifications using any information or characteristic.

Examples of characteristics and information that identification set generator 224 may use include, but are not limited to, previously visited locations, previous searches, previous inputs corresponding to selection of a link to a geographic location, timestamps associated with the previous searches, a current time of day, or one or more queries associated with other client devices within a time period and/or within a predetermined radius of the client device. Identification set generator 224 may retrieve characteristics of client device 202 from characteristic database 234 and/or receive them from characteristic generator 222. Identification set generator 224 may obtain some characteristics, such as the current time of day, through other mechanisms such as an internal clock of intermediary server 214. Identification set generator 224 may also retrieve characteristics of other client devices (e.g., queries of other client devices within the time period) from characteristic database 234. Each characteristic may be associated with a timestamp that may be used as an input in the set of identifications and/or to determine whether to include the characteristic in the set of identifications. For example, identification set generator 224 may only include characteristics of client device 202 and/or other client devices that were generated within the previous week. Identification set generator 224 may identify characteristics from the timestamps associated with them. Identification set generator 224 may use the timestamps for other reasons such as to identify specific days during the week or times during the day from which to use characteristics in the set of identifications. Identification set generator 224 may use characteristics from any time period and based on any criteria.

To generate the set of identifications, identification set generator 224 may convert each characteristic into machine learning model-readable form. For example, each characteristic may be converted or associated with a numerical value, binary code, matrix, vector, etc. Identification set generator 224 may identify the numerical value associated with the characteristic from a look-up table in a database (e.g., characteristic database 234). In some implementations, identification set generator 224 may use value in the database for characteristics associated with words (e.g., previously visited locations) and/or the numerical values of numerical characteristics as identifications in the set of identifications. Identification set generator 224 can normalize the numbers into values between −1 and 1 using any technique so operations can be performed on them by machine learning models. Identification set generator 224 can normalize the numbers into any value ranges. Once normalized, if at all, application 226 may input the set of identifications into one or more learning models.

Identification set generator 224 may generate sets of identifications periodically over time or each time intermediary server 214 receives a location signal from client device 202. Identification set generator 224 may generate the sets of identifications at any time. Application 226 may use each set of identifications as an input into one or more machine learning models to determine whether it is likely that the user will select map application 210 and/or predict a query of the user.

Memory 218 is shown to include application 226. Application 226 may comprise an application, server, service, daemon, routine, or other executable logic that may determine whether the user will select map application 210 to launch it and/or determine a query prediction of a user before the user inputs any portion of a query into map application 210, in some implementations. Application 226 may include one or more machine learning models such as, but not limited to, a neural network, random forest, a support vector machine, etc., that are configured to automatically determine whether the user will soon (e.g., within a predetermined time period) select map application 210 to execute it (e.g., in a binary classification system) and/or a query prediction that can be used to select a link to a geographical location of an entity to display to the user. For example, a first learning model of application 226 may receive a set of identifications generated by identification set generator 224 and determine whether a user will soon select a map application to execute it on a client device. A second machine learning model of application 226 may receive the same set of identifications and generate a query prediction for a client device before a user of the client device provides an input query. In some implementations, the second machine learning model may generate the query prediction responsive to the first machine learning model predicting that it is likely that the user will soon select the map application.

Application 226 may receive sets of identifications from identification set generator 224 that include various characteristics as described above and apply the sets of identifications to one or each of the machine learning models. In some implementations, the first machine learning model may predict whether the user will soon select map application 210 to execute it on client device 202. The first machine learning model may do so based on a set of identifications generated by identification set generator 224. In some implementations, the first machine learning model may generate confidence scores for two launch states, a positive and a negative launch state. The positive launch state may be associated with a prediction that the user will select map application 210 soon, and the negative launch state may be associated with a prediction that the user will not select map application 210 soon. For example, the set of identifications may include characteristics of client device 202 indicating that client device 202 is not moving and that it is in the middle of the morning. Based on various tuned weights and/or parameters, the first machine learning model may determine a low confidence score for the positive launch state and/or a high confidence score for the negative launch state because it is unlikely that the user will select map application 210. Conversely, if the characteristics indicate that the user has moved within the last hour and it is in the afternoon, the first machine learning model may determine a high confidence score for the positive launch state and a low confidence score for the negative launch state. The first machine learning model may generate any confidence scores for launch states based on any characteristics.

Application 226 may compare the confidence scores to a predetermined threshold to determine if the user will soon likely select map application 210. If application 226 determines the confidence score associated with the positive launch state exceeds the threshold, application 226 may determine that the user is likely or will select map application 210. However, if application 226 determines the confidence score associated with the negative launch state exceeds a predetermined threshold instead of or in addition to the confidence score associated with the positive launch exceeding the threshold, application 226 may determine the user likely will not select map application 210. In some implementations, the first machine learning model may repeatedly predict whether the user will soon select map application 210 each time the first machine learning model receives a set of identifications from identification set generator 224. Consequently, application 226 may be able to predict instances when a user would likely select map application 210 so content may be selected and/or provided to client device 202 before the user makes the selection while avoiding any unnecessary selections or transmissions of content.

In some implementations, in response to application 226 determining that a user will likely select map application 210, the second machine learning model may predict a query prediction that the user will likely input into map application 210 upon selecting it. The query prediction may be a string of words that the second machine learning model predicts a user may input into map application 210 to obtain directions to a specific location and/or search for a group of locations. The second machine learning model may predict the query prediction based on the same or a similar set of identifications that are input into the first machine learning model. For example, the second machine learning model may predict that the user will input the phrase "pizza" based on an identification set with a current time of day of 7:00 P.M. and a current location around multiple pizza restaurants. The second machine learning model may predict any word or phrase as the query prediction.

In some implementations, the second machine learning model may predict confidence scores for multiple query predictions based on various identification sets. Application 226 may select a query prediction associated with a highest confidence score and/or that exceeds a threshold as the query prediction that most accurately predicts what the user would likely input as a query into map application 210. For example, the second machine learning model may predict a query prediction associated with a "pizza" string has a confidence score of 80%, a query prediction associated with an "ACME, Inc." string has a confidence score of 30%, and a query prediction associated with a "movie theater" string has a confidence score of 15%. The second machine learning model may compare each confidence score with each other and determine that the pizza string has the highest confidence score. Accordingly, application 226 may select the pizza string as the most likely query. In some implementations, the second machine learning model may compare the pizza string confidence score to a threshold. If it exceeds the threshold, application 226 may still select the string. However, if the confidence score does not exceed the threshold, transmitter 230 may send a signal to client device 202 indicating no query prediction could be found. Transmitter 230 may send a similar signal if multiple query predictions are associated with the same highest confidence score or, in some cases depending on the configuration of application 226, multiple confidence scores exceed the threshold.

In some implementations, the second machine learning model may generate a query prediction based on intermediary server 214 receiving an indication that the user selected map application 210. Identification set generator 224 may generate an identification set using the current location of client device 202 when map application 210 was selected and other characteristics about client device 202 and the second machine learning model may predict a query before the user provides any input into map application 210. Consequently, content may be provided to client device 202 immediately upon receiving a request from client device 202 prior to receiving such a request.

Memory 218 is shown to include link selector 228. Link selector 228 may comprise an application, server, service, daemon, routine, or other executable logic to select a link to directions of a geographical location of an entity, in some implementations. Link selector 228 may select the link from link database 232 and transmitter 230 may transmit the link to client device 202. The link may be a link to a geographic location of an entity including various directions to the geographic location from the current location of client device 202. In some implementations link selector 228 may select the link based on the query prediction of the machine learning model of application 226. Links in link database 232 may be individually associated with various query predictions and, in some cases, current locations of client devices. Link selector 228 may identify one or more links from link database 232 by comparing the selected query prediction to a look-up table in link database 232. Transmitter 230 may transmit the one or more links to client device 202 so the user can select and obtain directions to the geographical location associated with the link. Link selector 228 can use the query prediction along with other contextual information (e.g., characteristic data) including current location information about client device 202 to select one or more links to transmit to client device 202. Link selector 228 may select any number of links to transmit to client device 202.

Memory 218 is also shown to include link database 232, in some implementations. Link database 232 can be a dynamic database including characteristics of client devices for which intermediary server 214 has collected data. Link database 232 can be a graph database, MySQL, Oracle, Microsoft SQL, PostgreSql, DB2, document store, search engine, key-value store, etc. Link database 232 can be configured to hold any amount of data and can be made up of any number of components. The links may include links to websites of entities, links to directions to the physical geographic location of entities, links to pictures associated with the entities, etc. Each link may be associated with one or more entities (e.g., content providers or content servers). Each link may also be associated with one or more search queries. Link database 232 may be associated with any type of location or entity. In some implementations, link database 232 may be formatted as a look-up table where links are individually associated with various content providers and/or search queries. Link selector 228 may retrieve links from link database 232. Transmitter 230 may transmit the links to client device 202.

In some implementations, link selector 228 may select the link by transmitting a predicted query to one or more content servers (e.g., content server 236 and content server 238). Link selector 228 may transmit the predicted query along with characteristic information about client device 202 to the content servers. Each content server may associate a value with the predicted query. Link selector 228 may receive (e.g., select) the link associated with the content server that associated the highest value with the query prediction. In some implementations, link selector 228 may receive multiple links associated with the highest values. Transmitter 230 may transmit any links that link selector 228 receives or selects to client device 202 for processing.

Memory 218 is shown to include transmitter 230. Transmitter 230 may comprise an application, server, service, daemon, routine, or other executable logic to transmit links to geographic locations of entities to various client devices, such as client device 202. Transmitter 230 may transmit any links that link selector 228 selects based on query predictions made by the second machine learning model of application 226. Depending on the configuration of transmitter 230, transmitter 230 may transmit the links to client device 202 before intermediary server 214 receives a request for content or any indication that the user selected map application 210 of client device 202. In some implementations, transmitter 230 may transmit the selected link after intermediary server 214 receives a request for content and/or an indication that the user selected map application 210. However, if application 226 determines that a query prediction could not be determined based on location and/or characteristic information of client device 202, transmitter 230 may transmit a signal to client device 202 indicating a query prediction could not be found. Similarly, transmitter 230 may send a signal to client device 202 if a link was not selected.

Figure 3A:
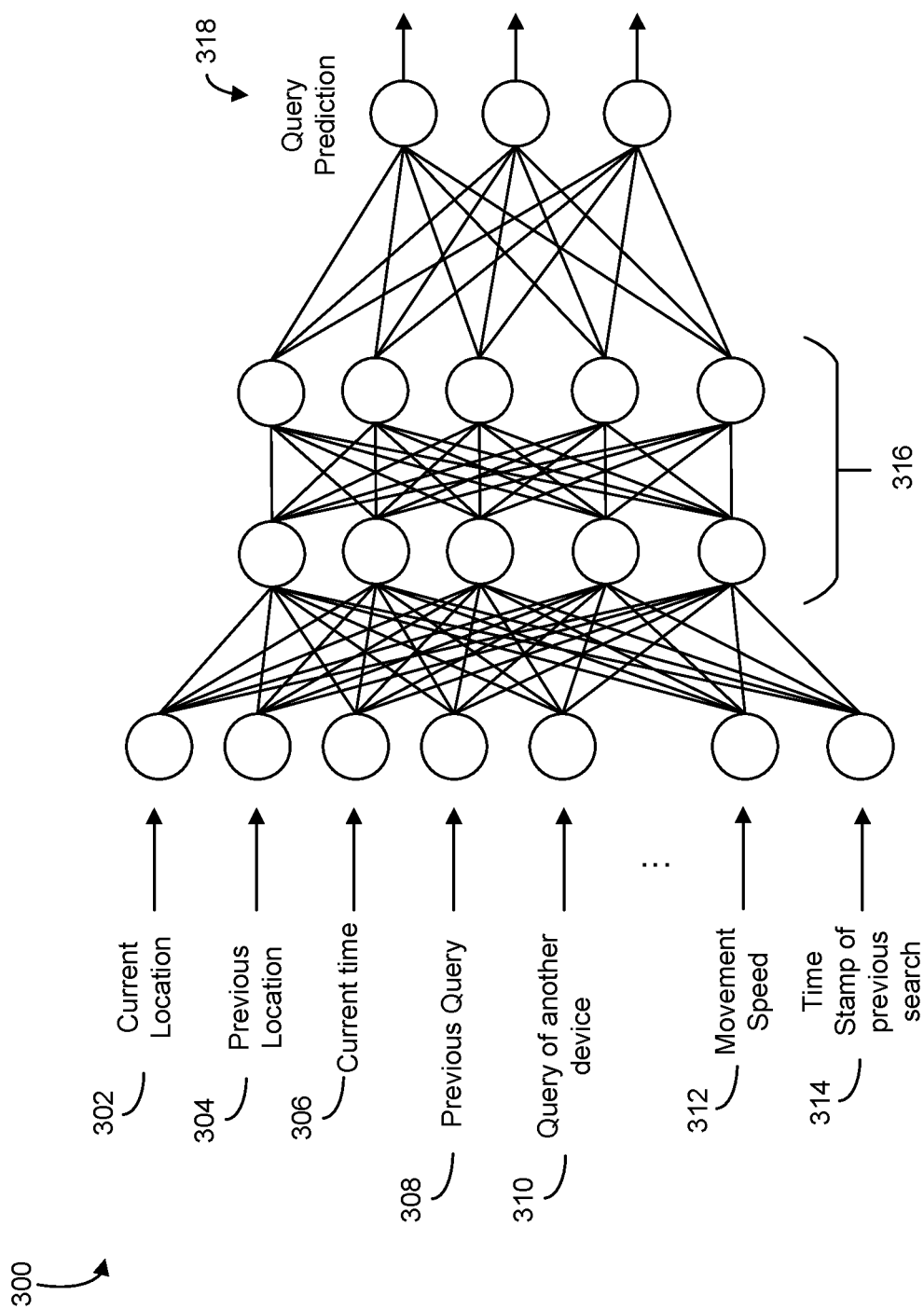
FIG. 3A is a drawing of a machine learning model for predicting queries, according to some implementations.

Referring to FIG. 3A, a drawing of an example neural network 300 for predicting queries is shown, according to some implementations. Neural network 300 may be an example implementation of a machine learning model of application 226, shown and described with reference to FIG. 2. Application 226 may include any number and/or any type of learning model, such as, but not limited to, a neural network, random forest, a support vector machine, etc. Neural network 300 is shown to include inputs associated with characteristics of a client device in communication with an intermediary server (e.g., intermediary server 214) for serving content. The inputs may include, for example, a current location 302, a previous location 304, a current time 306, a previous query 308, a query of another device 310, a movement speed 312, and a timestamp of a previous search 314. Inputs 302-314 may operate as input nodes that provide weighted outputs to nodes of hidden layers 316. In some implementations, the inputs may be associated with a feature vector. Nodes of hidden layers 316 may perform various functions on the weighted signals of the inputs and provide a weighted output signal to output layer 318. Output layer 318 may include one or more output nodes and provide a confidence score predicting a likelihood of various search queries of a user that is accessing or will access a map application on their client device. Neural network 300 can include any number of components (e.g., any number of hidden layers/nodes, input nodes, output nodes, etc.).

The outputs of each of input nodes 302-314 and the nodes of hidden layers 316 may be signals or combinations of signals of neural network 300. Each of the signals or combinations of signals may be associated with a weight (e.g., a prediction score). For example, an input signal associated with current time 306 may have a weight of 0.8 while an input signal associated with previous query 308 may have a weight of 0.2. The weights may indicate an importance of a particular input compared to other inputs. For example, inputs related to movement speed 312 may have a higher weight than inputs related to timestamp of previous search 314. The signals of each input may each have any weight. The weights may be tuned via training as described below. Further, as described below, nodes of hidden layers 316 may perform one or more operations on the signals and then output weighted signals to output layer 318.

Inputs 302-314 may be values associated with characteristics of a client device. Inputs 302-314 may be fed into neural network 300 over time so neural network 300 may continuously predict queries of a user in real-time. In some implementations, inputs 302-314 may be continuously fed into neural network 300 or fed into neural network 300 as periodically-spaced samples (e.g., as time series data). The data of inputs 302-314 may be associated with timestamps indicating when the data was collected or generated. For example, neural network 300 may receive a list of previous locations 304 and timestamps associated with the list as an input. Each timestamp may indicate a time that a client device was at a particular location. The timestamps may be at spaced intervals such as every five seconds, every 10 seconds, ever 20 seconds, etc. The timestamps may be generated based on the time that the client device sent a location signal to the intermediary server or the time that the intermediary server received the location signal.

The input nodes associated with inputs 302-314 may be a first layer of neural network 300 that represents the input layer of neural network 300. Each input can be a node of the input layer that sends a weighted signal to one or more nodes of hidden layers 316. Inputs 302-314 can be values that were converted from their collected values, by the server or processor associated with neural network 300, into numerical values, binary code, matrices, vectors, etc. The server can then normalize the numbers into values between −1 and 1 using any technique so operations can be performed on the numbers by the nodes of hidden layers 316. The server can normalize the numbers into any value ranges. After the server normalizes the numbers to values between −1 and 1, neural network 300 can transmit the values to nodes of hidden layers 316 as weighted signals.

Hidden layers 316 may be one or more layers of nodes that receive input signals or combinations of input signals from inputs 302-314. The nodes of hidden layers 316 may perform one or more operations on the input signals or combinations of signals and provide signals or combinations of signals to output layer 318. While two hidden layers are shown, there may be any number of hidden layers. The nodes of each hidden layer may provide output signals to nodes of other hidden layers or to output layer 318. In some embodiments, the number of nodes or layers of hidden layers 316 are correlated with the number of input nodes and/or the number of output nodes of neural network 300. Neural network 300 can perform operations, such as multiplication, a linear operation, sigmoid, hyperbolic tangent, or any other activation function, at each layer of hidden layers 316 based on the values associated with input nodes 302-314 and the weights associated with signals or combinations of signals transmitted between input nodes 302-14 and the nodes of hidden layers 316. Weighted signals or combinations of signals from hidden layers 316 can be sent to output layer 318.

Output layer 318 may be a layer of neural network 300 that is dedicated to providing confidence scores for various query predictions. The query predictions may be strings that neural network 300 predicts a user accessing a map application may search upon selecting and accessing the map application. The confidence score may indicate a likelihood that a query prediction is correct. For example, an output node of output layer 318 may correspond with a 70% likelihood that a user will search for a hamburger restaurant in a search form of the map application. Another output node may correspond with a 20% likelihood that the user will search for a hamburger restaurant in the same search form. Neural network 300 may determine the 70% confidence score, the 20% confidence score, and any number of other confidence scores for other query predictions based on inputs 302-314. Such confidence scores may be compared with each other and/or a threshold by a server to predict whether the confidence score is correct.

The weights associated with signals or combinations of signals that travel between inputs 302-314 and hidden layers 316 and then between hidden layers 316 and output layer 318 can be automatically determined based on training data provided by an administrator. The training data can include inputs similar to inputs 302-314 and an expected output based on the inputs. Neural network 300 can initially have randomized weights associated with each of its signals or combinations of signals, but after a sufficient amount of training data has been input into neural network 300, weights can be determined to get to a degree of certainty that an administrator identifies as sufficient. In some implementations of the systems and methods described herein, the inputs and signals or combinations of signals that are associated with the highest weight can be characteristics associated with a user's current location, current time of day, and/or a movement speed. Any input or signal can be associated with any weight. To use the training data, neural network 300 can be a supervised system that implements back propagation. After training data is used as an input and neural network 300 identifies probabilities of an output, neural network 300 can identify an expected output from the training data and identify the difference between the actual output and the expected output. Neural network 300 can identify the difference as a delta and modify the weights so the actual outputs are closer to the expected outputs at a rate proportional to the difference. Neural network 300 can modify weights of its signals or combinations of signals using a learning rate that identifies a degree of change of each weight for iteration of training data that is implemented into neural network 300. As more and more training data is fed into the neural network, weights of signals or combinations of signals could change and delta could become smaller. Consequently, the results can become more accurate over time, in some implementations.

In some implementations, neural network 300 may be trained in real-time as users select links that are selected based on query predictions that neural network 300 makes. For example, neural network 300 may predict a 90% score for a query prediction for an "ACME" string. The server may select a link based on the query prediction and cause the link to be displayed at a client device. A user may select the link, indicating that the query prediction of the ACME string was correct. Neural network 300 can use back-propagation techniques based on the selected link to increase any weights that of signals that are associated with the ACME string as described above.

In some implementations, neural network 300 can be a semi-supervised system where training data used as an input into the system includes labeled and unlabeled training data. This is advantageous when there is a large amount of data available that would take humans a large amount of time to label the data with the correct outputs. In the semi-supervised system, neural network 300 can receive data that just includes inputs to determine outputs and label the data based on the output. The newly labeled data can then be implemented into neural network 300 with the labeled dataset to train neural network 300 using back propagation techniques. Using the semi-supervised system, neural network 300 can continuously update as it predicts queries and users select links based on the query predictions.

Advantageously, through the use of neural network 300, the server may automatically predict a query for a user before the user provides any input or in some cases, selects a map application. The server may use the prediction to select content such as a link to a geographical location associated with an entity based on the predicted query responsive solely to the user's selection of the map application.

Figure 3B:
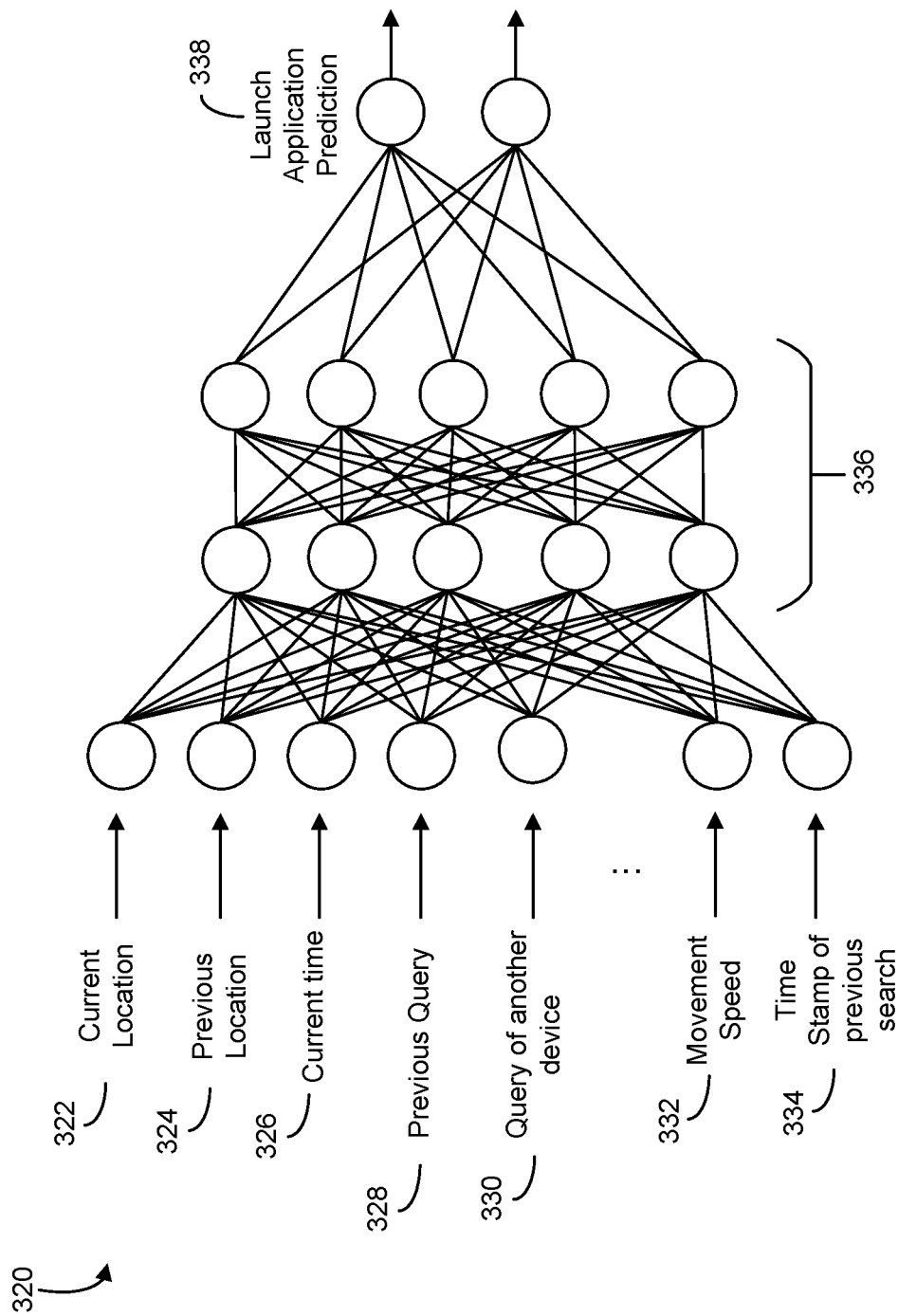
FIG. 3B is a drawing of a machine learning model for predicting a launch state of a mobile application, according to some implementations.

Referring to FIG. 3B, a drawing of an example neural network 320 for predicting a launch state of a mobile application is shown, according to some implementations. Neural network 320 may be an example implementation of a second machine learning model of application 226. While the second machine learning model is represented as a neural network, the second machine learning model may be any type of machine learning model. Neural network 320 may predict launch states of the mobile application. As described above, the launch states may indicate whether a user of a client device will likely launch a map application within a pre-determined time period (e.g., one second, five seconds, 15 seconds, one minute, five minutes, etc.). Neural network 320 may predict the launch state based on inputs of current location 322, previous location 324, current time 326, previous query 328, query of another device 330, movement speed 332, and timestamp of previous search 334. Inputs 322-334 may include any number of inputs. Further, as can be seen, inputs 322-334 may be similar to inputs 302-314, shown and described with reference to FIG. 3A. Consequently, the same data that may be used to predict queries may be used to determine whether a user will launch a map application within a predetermined time threshold.

Neural network 320 may operate similarly to neural network 300 and may include similar components. For example, in addition to inputs 322-334, neural network 320 may include hidden layers 336. Hidden layers 336 may include any number of hidden layers that receive weighted outputs from the input nodes associated with inputs 322-334. Hidden layers 336 may perform various activation functions such as multiplication, a linear operation, sigmoid, and hyperbolic tangent on the values of the weighted signals and provide a weighted output to output layer 338.

Output layer 338 may include two output nodes, one output node may be associated with a likelihood that a user will likely access a map application within a predetermined time threshold (e.g., a positive launch state) and another output node may be associated with a likelihood that the user will not likely access the map application within the predetermined time threshold (e.g., a negative launch state). The confidence scores may be any amount and may or may not aggregate to 1.0 or 100%.

Neural network 320 may be trained using similar supervised and semi-supervised training methods to those described above with respect to neural network 300. For example, a training data set may include an input-output pair including input device characteristics that are labeled with the correct output (e.g., [1,0]) indicating whether a user is about to select the map application. Neural network 320 may generate confidence scores for both launch application states and compare the confidence scores to the labeled output. Neural network 320 may adjust its internal weights/parameters using the back propagation techniques discussed above so it can more accurately predict launch application states for future inputs.

Neural network 320 can be trained in real-time based on whether neural network 320 correctly predicted whether the user would select the map application. Neural network 320 may identify instances where neural network 320 correctly predicted that a user would select the map application and use back propagation techniques with the output so the weights of neural network 320 can adjust according to the correct prediction. Consequently, weights associated with the correct predictions may increase. Neural network 320 may similarly be trained using correct predictions that the user would not select the map application. Consequently, neural network 320 may gradually become more accurate over time at predicting whether user will predict their respective map applications.

Advantageously, through the use of neural network 320, the server can automatically predict when a user may open a map application. The server may continuously feed inputs indicating the current characteristics of a client device hosting the map application into neural network 320, receiving confidence scores for launch prediction outputs for each set of inputs. In some instances, if the server predicts that a user will open the map application within a predetermined threshold, the server may feed the same inputs that were input into neural network 320 into neural network 300 to determine a query prediction for the user as described above. Using this query prediction the server may select content such as a link to a geographic location and, in some cases, send the link to a client device of the user before the user opens the map application. Consequently, when the user selects the map application on the client device to access it, the map application may automatically retrieve and display the link without any latency that is generally associated with transmitting and receiving signals from the server, as is generally present when client devices request content responsive to accessing map applications and inputting a query using previous systems and methods.

Figure 4:
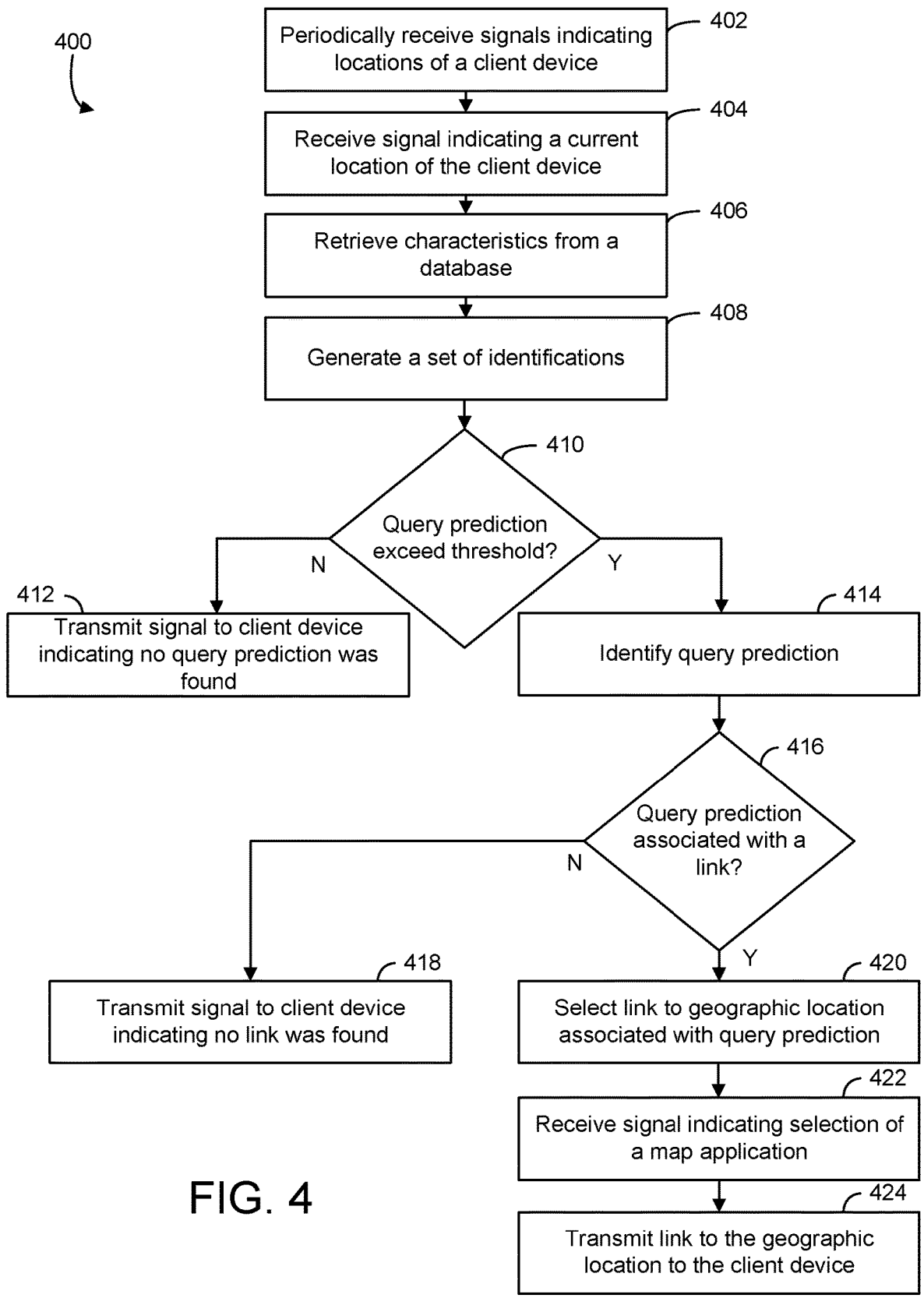
FIG. 4 is a flow chart illustrating a server-side method for low-latency provision of content, according to some implementations.

Referring to FIG. 4, a flow chart illustrating a server-side method for low-latency provision of content is shown, according to some implementations. Method 400 can be performed by a server (e.g., intermediary server 214). The operations of method 400 may be performed at any time and in any order. At an operation 402, the server can periodically receive signals indicating locations of a client device. The server can receive the signals automatically or upon polling the client device. The server may receive the signals or poll the client device at set times during the day, pseudo-randomly, periodically at set intervals, or in any other variation or pattern. Upon receiving the signals including the location of the client device, the server may tag the location with a timestamp and, in some cases, a device identifier identifying the client device, indicating that the server received the signal or the client device transmitted it. The server may store tagged location in a characteristic database as previous locations or characteristics upon receipt.

At operation 404, the server may receive a current location of the client device. The current location may represent the location of the client device when the client device sends the signal. In some implementations, operation 404 may be performed and thereafter operations 406-422 may be performed at each instant the server receives a location signal during operation 402. The server may receive a current location of the client device and tag it with a timestamp similar to how the server tagged locations of the client device in operation 402. At operation 406, the server may retrieve characteristics of the client device from a database of the server. Examples of the characteristics include, but are not limited to, previously visited locations, previous queries, previous inputs corresponding to selection of a link to a geographic location, entities associated with previous locations, timestamps associated with the previous searches, a current time of day, or one or more queries associated with other client devices within a time period, etc. Each characteristic may be associated with the time the server stored it in the database or the time that it was otherwise generated. The server may retrieve the characteristics by identifying a device identifier of the client device and comparing the device identifier with the database. The server may identify a matching identifier in the database and retrieve characteristics associated with the matching identifier.

In some implementations, the server may only retrieve characteristics that are associated with a predetermined time frame. The time frame may be associated with the time that the server retrieves the characteristics from the database. For example, the server may only retrieve characteristics that are associated with a time within an hour of the time the server is retrieving the characteristics. Time frames may be of any length. Advantageously, by only using characteristics that are associated within a given time frame, the server may use more relevant data when applying the characteristics to a machine learning model to predict a query as described below. For example, at 7 P.M. previous locations of a user between 6:30 P.M. and 7:30 P.M. may be more relevant to predict a user query than previous locations of the user during the workday.

In some implementations, in addition to or instead of the time frame described above, the server may only retrieve characteristics that are associated with a date or time after or before another date or time as set by an administrator. For example, the server may be configured to only retrieve characteristics associated with the client device within the last week. In another example, the server may be configured to only retrieve characteristics associated with the client device generated or received after 12 P.M. during the day. Advantageously, by using such time restraints, an administrator may ensure that relevant data is being used to predict queries for users. For example, if a user has been feeling sick for a week, the user may not have been going to different locations as much or may have various doctor's appointments to go out. If the server is only configured to retrieve characteristics from within the last week, the server may more accurately predict search queries for the user in the map application than if the server used all of the values of characteristics that the server had ever stored. Users may customize the server to use any number of time thresholds and/or time frames from which to retrieve data.

At operation 408, the server may generate a set of identifications. The server may generate the set of identifications using the current location and the retrieved characteristics of the client device. The server may generate the set of identifications (e.g., a feature vector) by identifying values associated with each characteristic in a database. Non-numerical categorical characteristics may be associated with a numerical value in the database. For example, Baltimore may be associated with a value of 32, a previous query of "hamburger" may be associated with a value of 86, and the entity of FakeCo. may be associated with a value of 114. Values for any characteristics may be in the database. The server may generate the set of identifications by retrieving such values associated with the characteristics of the client device along with a value associated with the current location of the client device. Numerical values may be represented as themselves in the set of identification or as other values similar to the non-numerical characteristics. Each value in the set of identifications may be an identification. In some implementations, the server may normalize the values (e.g., to values between −1 and 1) according to the machine learning models of the server so the machine learning models may process the set of identifications.

In some implementations, in addition to using characteristics from the database and the current location of the client device to generate the set of identifications, the server may use the characteristics and/or the current location to generate further characteristics of the client device to input into the set of identifications. For example, the server may determine a speed with which the client device is moving by comparing the current location with the most recent previous location of the client device and the associated timestamps. The server may input the determined speed with the set of identifications. Advantageously, by determining a speed of the client device, the server may determine whether the person is moving and, in some cases, a mode of travel. For example, the server may determine that the client device is traveling at 60 mph. Consequently, the server may determine that the person is moving in a car and may be able to visit locations that are further away than if the person was traveling at 5 mph and thus walking. The server may input the speed, the fact that the client device is moving, or the mode of travel into the set of identifications.

In some instances, the server may set a speed threshold to determine if a device is moving. For example, the server may set a speed threshold to be 3 mph. If the server determines the client device is moving at a speed lower than 3 mph, the server may determine the client device is not moving. The server may input such a determination into the set of identifications.

In some implementations, in addition to or instead of, using the movement speed of the client device to determine if the device is moving, the server may use the current location of the user. For example, if the user is located on a highway, the server may determine the user traveling via car. If the user is in the user's home, the server may determine the user is not moving. The server may use any location to determine whether the user is moving.

At operation 410, the server may determine whether a query prediction exceeds a threshold. The server may input the set of identifications generated at operation 408 into a machine learning model and obtain an output including one or more confidence scores for various query predictions based on the set of identifications. Each query prediction may be associated with a word or phrase comprising a predicted string of words that the machine learning model predicted the user will input into a map application upon selecting the map application via the client device. The server may compare a confidence score for each word or phrase to a predetermined threshold and determine whether any of the confidence scores for the words or phrases exceed the predetermined threshold. If the server does not identify a word or phrase that exceeds the threshold, at operation 412, the server may transmit a signal to client device indicating that no query prediction was found. In some implementations, if the server identifies more than one confidence score that exceeds the threshold, the server may transmit a similar signal to the client device. However, if the server identifies a query prediction that exceeds the threshold, at operation 414, the server may identify the query prediction associated with the word or phrase that exceeds the threshold.

At operation 414, the server may determine whether the identified query prediction is associated with a link to a geographical location of an entity. Links to geographical locations may be content provided by third party content providers that users can select to obtain directions to the geographical location. For example, ACME may provide a link to the geographic location with which ACME is associated (e.g., has a brick and mortar store). The server may transmit the link to the client device, which can display the link via the map application. A user can select the link and obtain directions on how to get to ACME from the user's current location. The user can travel to ACME using the directions.

To determine if the identified is associated with a link, the server may compare the identified query prediction to a database that stores links to various geographic locations of entities. Each link to the geographic location may be associated with a variety of query predictions. Further, query predictions may be associated with multiple geographic locations within the database. In some implementations, the server may compare the identified query prediction to the database and select a link that is associated with the identified query prediction. The server may select the link that is closest in geographic location along with being in context with the identified query prediction. For example, the server may select a link associated with the closest burger restaurant as a result of an identified query prediction of "hamburger." In some implementations, the server selects a plurality of links to transmit to the client device. An administrator may define how many links to transmit to the client device.

In some implementations, the server may transmit predicted queries and/or characteristics of the client device to one or more content providers. The content providers may associate values with query prediction and transmit a link associated with the highest value and/or each link with its associated value back to the server. The server may receive (e.g., select) the link associated with the highest value. In some implementations, the server may receive multiple links based on the identified query prediction.

If the server determines that there are not any links associated with the query prediction, at an operation 418, the server may transmit a signal to the client device indicating that no link was found. However, if the server identifies one or more links as described above, at an operation 420, the server may select one or more of the identified links. In some implementations, the server may select the link that is associated with the highest value. The server may receive such a link from a content provider. In some implementations, based on how the server is configured, the server may select multiple links. In such implementations, the server may select the links that are associated with the highest values. The server may select any number of links.

At an operation 422, the server may receive a signal indicating a selection of a map application. The server may receive the signal from the client device or from a server associated with the map application. In some implementations, the signal indicating selection of a map application may include a request for content (e.g., a link to a geographic location). At an operation 424, the server may transmit the selected link to the client device. In some implementations, the server may transmit the link with a graphical user interface of the map application. The links may appear on a user interface showing a map of the area. A user may select the link to view directions to the geographic location associated with the link. In some implementations, the server may transmit multiple links. If the links appear in list form, the server may organize the links (e.g., from top to bottom) based on which link is associated with the highest value, which link is associated with the closest destination, which link is the most relevant to the user, etc. The server (or the client device) may organize the links in any fashion on the interface.

Advantageously, because the server selected the link to transmit to the client device before receiving a signal indicating selection of the map application, the server may not need to take time to process any contextual information about the client device to select a link to transmit. The server may already have the link ready to transmit upon receiving the signal indicating selection of the map application. Consequently, the server may immediately transmit the link upon receiving the signal, resulting in a low-latency transmission of content.

In some implementations, operation 422 may be performed during or before operation 404 or otherwise immediately before operation 406. For example, the server may receive a signal indicating selection of a map application concurrently with a signal indicating a current location of the client device at operation 404. Upon receiving the signal indicating selection of the map application, at operation 406, the server may retrieve characteristics from the database and perform the other operations of method 400 to provide a contextually relevant link to the client device. The server may provide the link to the client device before the user inputs any portion of a query into a map application. The server may be able to provide contextually relevant links quickly as a result of having the periodically obtained signals indicating the location of the client device readily available to be retrieved upon receiving a request for content from the client device. Using such signals may enable the server to provide a contextually relevant without needing to wait for an input query. Further, because the server can use the previous signals to select the link, the server can provide contextually relevant content to the client device.

Figure 5:
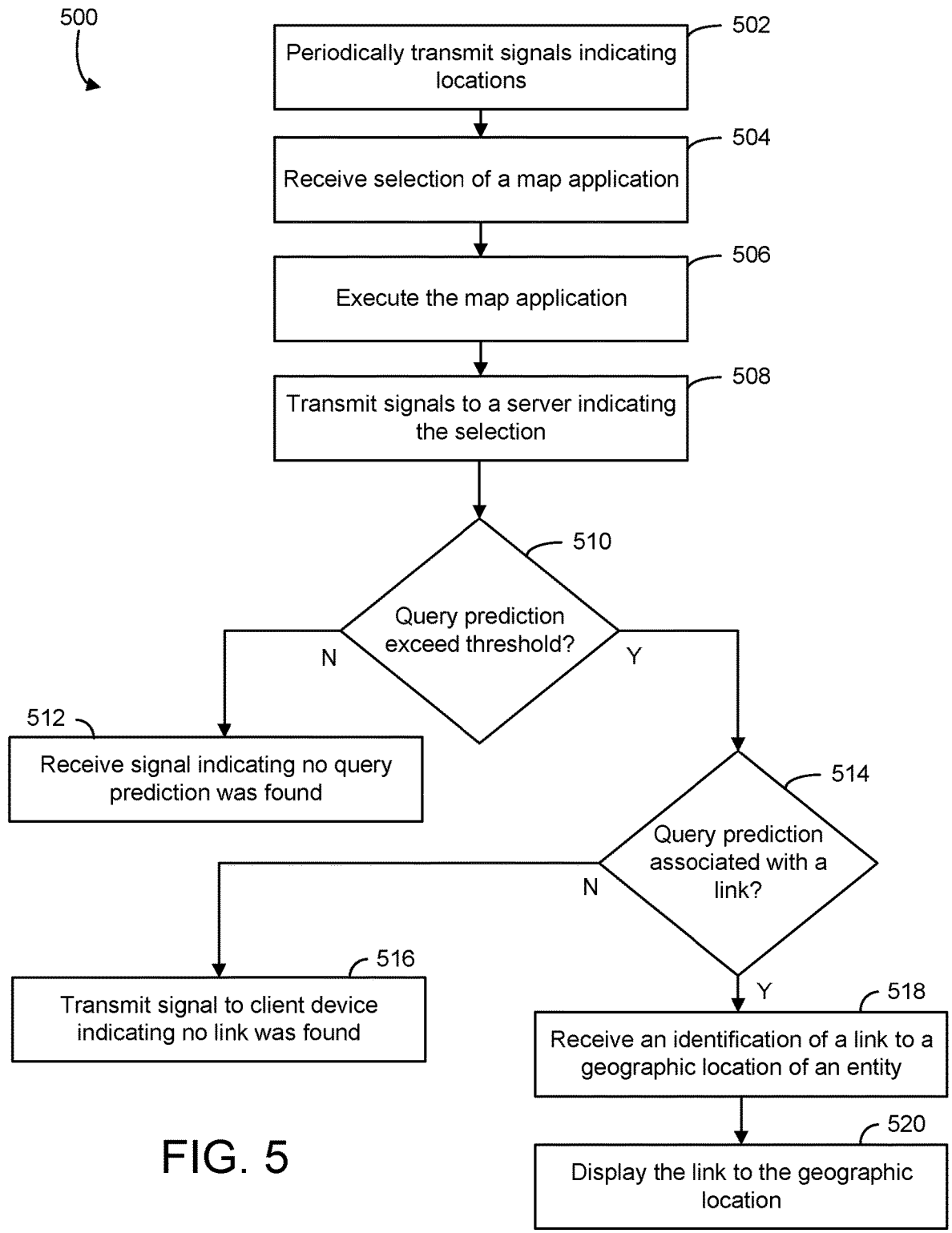
FIG. 5 is a flow chart illustrating a client-side method for low-latency provision of content, according to some implementations.

Referring to FIG. 5, a flow chart illustrating a client-side method 500 for low-latency provision of content is shown, according to some implementations. Method 500 can be performed by any client device (e.g., client device 202) or a server (e.g., intermediary server 214). The steps of method 500 may be performed at any time and in any order. At an operation 502, the client device may periodically transmit signals indicating the location of the client device to a server. The location may be the current location of the client device at various points in time. The client device may transmit its location using various technologies such as through GPS, cell phone tower signals, etc. The client device may transmit its location in the background of the client device so a user may operate various applications and/or make phone calls while the client device is transmitting its current location.

At an operation 504, the client device may receive a selection of a map application. The client device may receive the selection from a user via a touch pad, a mouse click, or via any other selection mechanism. In some implementations, a processor of the client device automatically selects the map application. For example, the map application may be configured to automatically transmit location signals to the server. To do so, the processor of the client device may automatically select the map application, which can facilitate transmission of the location of the client device. At an operation 506, the client device may execute the map application. The client device may process the selection of the map application and generate a user interface associated with the map application to a user. The user interface may show a map of the geography around the immediate area of the current location of the user. The user interface may also show a query form, which the user can select to input a query associated with a location to which the user would like directions. At an operation 508, the client device may transmit signals to the server indicating the selection of the map application. The signals may include the current location of the client device. In some implementations, the signals also include a request for content such as a link to a geographic location of an entity, as described above.

At an operation 510, the server may receive the signals and determine whether a query prediction exceeds a threshold. To do so, the server may perform operations 404-410, shown and described with reference to FIG. 4. For example, based on the current location and other characteristics of the client device, the server may predict what a user will likely query (e.g., an intent) in the query form of the map application. Examples of different predictions include, but are not limited to, "pizza restaurant," "beach," "breakfast," etc. The server may predict any query. The server may predict confidences scores for multiple queries and determine if any of the confidence scores exceed a predetermined threshold, as described above. If none of the confidence scores exceeds the threshold (or more than one confidence score exceeds the threshold), at an operation 512, the client device may receive a signal indicating no query prediction was found.

However, if the server determines that a query prediction exceeds the threshold, at an operation 514, the server may determine whether there is a link associated with the query prediction. To do so, the server may perform operations 414-416, shown and described with reference to FIG. 4. For example, the server may identify the query prediction associated with a confidence score that exceeds the threshold and transmit the query prediction to one or more content providers who can associate values with the links. The server can receive select the link (or multiple links depending on how the server is configured) that is associated with the highest value. However, if the server does not identify or select a link associated with the query prediction, the server may transmit a signal to the client device indicating that no link was found, which, at an operation 516, the client device may receive.

If the server selects a link, at an operation 518, the client device may receive an identification of the link to a geographic location of an entity. The client device may receive any number of links. At an operation 520, the client device may display the link to the geographic location at the user interface associated with the map application. The client device may display the link in list format and/or, in some cases, at a representative location of the geographic locations on the map of the user interface. A user may select the link to view directions to the geographic location.

Advantageously, and as described above, the client device may receive the link from the server quickly upon sending the signal indicating that the map application is selected. The client device may receive the link with low latency as a result of the pre-processing that the server performs using the periodic location signals that the client device transmits to the server. In some implementations, the server periodically transmits links to the client device, which the client device can discard if the user does not select the map application. Consequently, in either implementation, the client device may quickly display any received links to a user upon receiving a selection of the map application.

Figure 6:
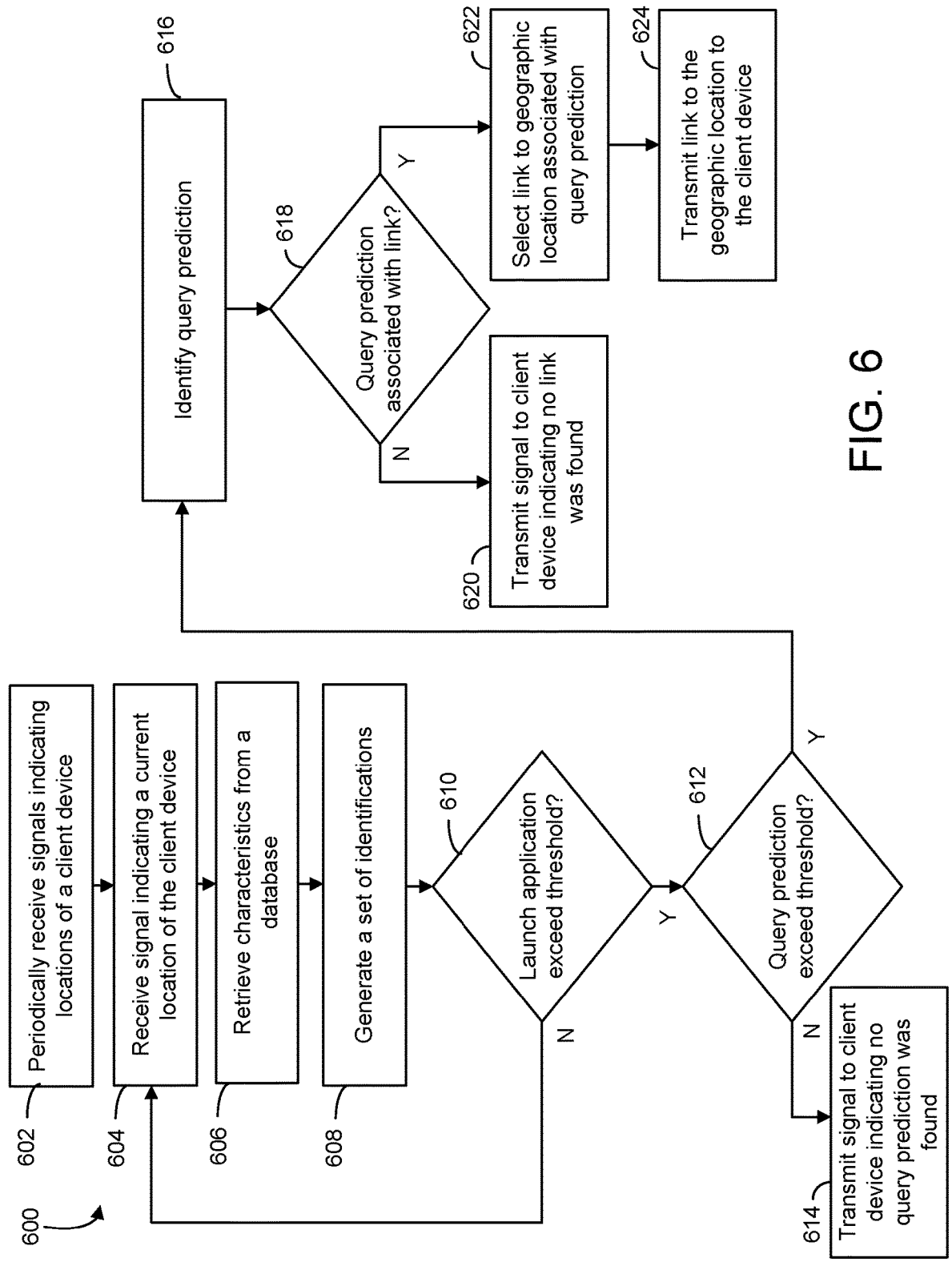
FIG. 6 is a flow chart illustrating another server-side method for low-latency provision of content, according to some implementations.

Referring to FIG. 6, a flow chart illustrating another server-side method 600 for low-latency provision of content is shown, according to some implementations. Method 600 can be performed by a server (e.g., intermediary server 214). The operations of method 600 may be performed at any time and in any order. Method 600 may be similar to method 400, however, the entirety of method 600 may be performed by the server prior to receiving any signals indicating a user selection of a map application. Method 600 may be performed to predict whether a user will select the map application and provide contextually relevant content (e.g., a link to a geographic location of an entity that a user likely wants to visit) to a client device if the server determines that the user is likely to select the map application soon. The server may provide the content and, consequently, when the user selects the map application, the client device may immediately display the link without sending any requests for content or waiting for the server to process the requests. Performance of method 600 may reduce the time it takes for a client device to provide contextually relevant content to a user.

At an operation 602, the server may periodically receive signals indicating locations of a client device. At an operation 604, the server may receive a signal indicating a current location of the client device. At an operation 606, the server may retrieve characteristics from a database. At an operation 608, the server may generate a set of identifications. Each of operations 602-608 may be similar to corresponding operations 402-408, shown and described with reference to FIG. 4.

At an operation 610, the server may determine whether a launch application state exceeds a threshold. The launch application state may be a prediction of whether it is likely that the user will select the map application to execute it on the client device. The prediction may be for whether it is likely that the user will select the map application within a time threshold (e.g., one second, five seconds, 10 seconds, 30 seconds, one minute, five minutes, etc.). The time threshold may be any time as configured by an administrator. The server may predict the launch application state by inputting the set of identifications generated at operation 608 into a machine learning model that is configured to predict the launch application state. The machine learning model may be a binary classifier that can predict that it is likely that the user will select the map application or that it is not likely that the user will select the map application. In some implementations, the machine learning model may predict confidence scores for each launch application state. For example, the server may predict a confidence score indicating a likelihood that the user will select the map application and another confidence score indicating a likelihood that the user will not select the map application. In some implementations, the server may only predict a confidence score for one of these states.

The server may compare the confidence scores to a threshold to determine whether it is likely that the user will select the map application to execute it within the time threshold. If the confidence score indicating that it is likely that the user will select the map application does not exceed the threshold, the server may return to operation 604 and periodically repeat operations 604-610 until the server determines that the machine learning model generated a confidence score that exceeds the threshold. The server may also return to operation 604 if the confidence score of each state exceeds the threshold. Advantageously, by repeatedly generating sets of identifications using location data and various characteristics of the client device and applying the sets of identifications to the threshold, the server may be constantly prepared to select links to various geographic locations should the user select the map application.

If the server determines that the confidence score associated with the positive launch application state exceeds the threshold, at an operation 612, the server may determine whether a query prediction exceeds a threshold. If the server determines that a query prediction does not exceed the threshold, at an operation 614, the server may transmit a signal to the client device indicating that no query prediction was found. However, the server determines that a query prediction does exceed the threshold, at an operation 616, the server may identify the query prediction (or query predictions, in some implementations, depending on how the server is configured) that exceeds the threshold. At an operation 618, the server may determine whether the query prediction is associated with a link. If the server determines that the query prediction is not associated with a link, at an operation 620, the server may transmit a signal to a client device indicating that no link was found. However, if the server determines that the query prediction is associated with a link, at an operation 622, the server may select a link to a geographic location associated with the query prediction. At an operation 624, the server may transmit the link to the geographic location to the client device.

Each of operations 612-624 may be similar to corresponding operations 410-420 and 424, shown and described with reference to FIG. 4. As noted above, each operation 602-624 of method 600 may be performed prior to the client device receiving an input indicating a selection of the map application. The server may predict when it is likely that the user will select the map application, predict a query that the user would make if the user were to select the map application, and transmit a link to a contextually relevant geographic location to the client device prior to the user selecting the map application. Consequently, when the user selects the map application the client device may quickly display the link without sending a request to the server, reducing lag time in displaying the link. In some implementations, operation 624 is performed responsive to the user selecting the map application to execute it and receiving a signal indicating such information. Because the server has already selected the link to transmit to the client device at this point, the server may send the link without any time-consuming processing.

Figure 7:
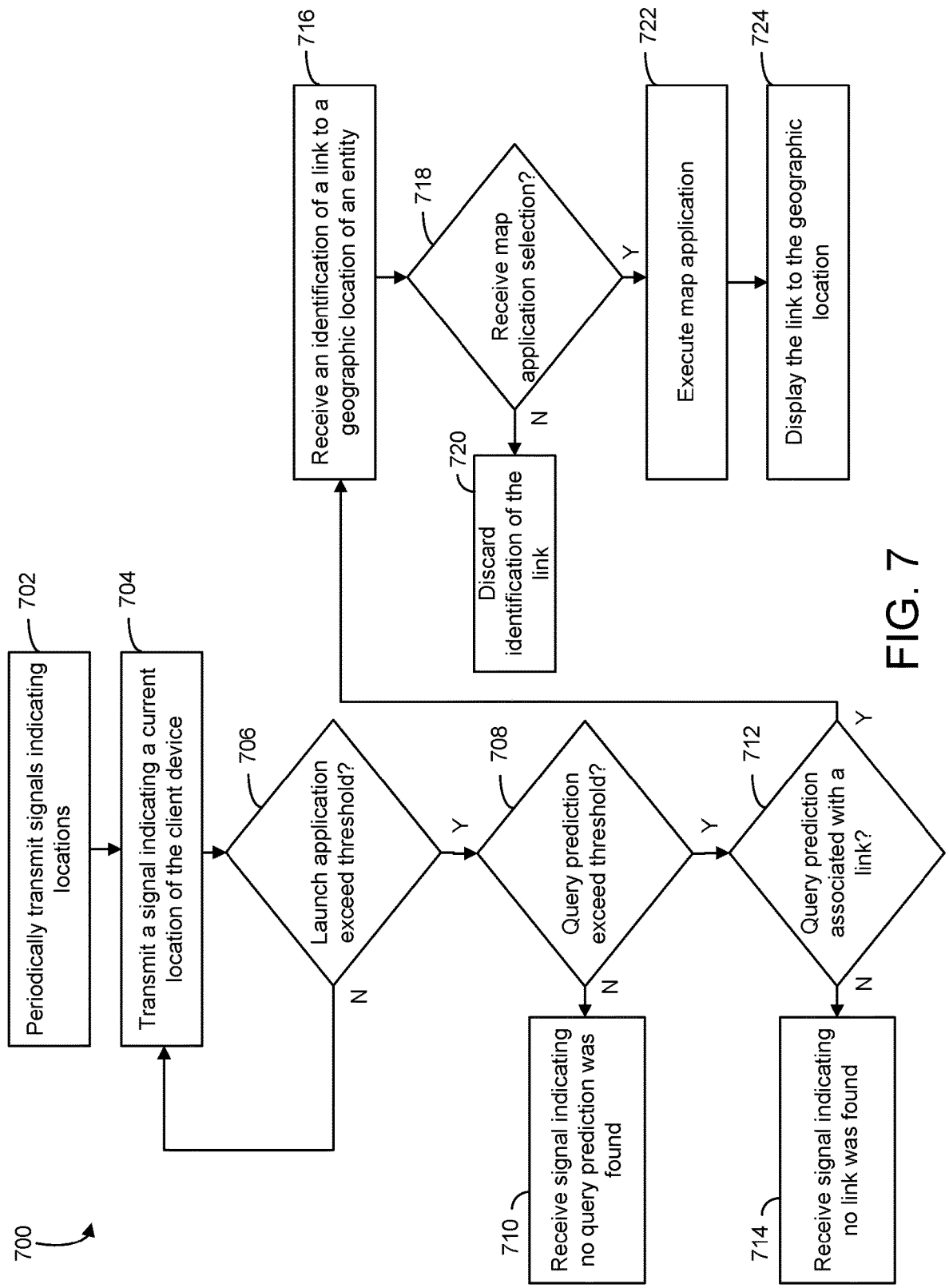
FIG. 7 is a flow chart illustrating another client-side method for low-latency provision of content, according to some implementations.

Referring now to FIG. 7, a flow chart illustrating another client-side method 700 for low-latency provision of content is shown, according to some implementations. Method 700 can be performed by a client device (e.g., client device 202). The operations of method 700 may be performed at any time and in any order. Method 700 may be similar to method 500, however, the client device performing method 700 may receive a link to a geographic location of an entity to display to a user before the user selects a map application associated with the link. Method 700 may be performed to quickly display content to a user that may enable the user to view and select a link that provides directions to a contextually relevant location for a user. Previous implementations may require the user to provide an input and wait for a server to process the input to receive contextually relevant content. Through performance of method 700, content may be available to the user faster, in some implementations.

At an operation 702, the client device may periodically transmit signals indicating locations of the client device. At an operation 704, the client device may transmit a signal indicating a current location of the client device to the server. Operations 702 and 704 may be similar to operations 502 and 504, shown and described with reference to FIG. 5. At an operation 706, the server may determine, based on the current location and various characteristics of the client device, as described above, a launch application state exceeds a threshold. If the server determines the launch application state does not exceed the threshold, the client device may perform operation 704 again. Operations 704 and 706 may be repeatedly performed until the server determines that the launch application state exceeds the threshold. At an operation 708, the server may determine whether a query prediction exceeds a second threshold. Operations 706 and 708 may be similar to operations 610 and 612, shown and described with reference to FIG. 6. If the server determines that the query prediction does not exceed the second threshold, at an operation 710, the client device may receive a signal indicating that no query prediction was found. In such instances, the client device may not be able to immediately display content to a user upon receiving a map application selection. If the server determines that a query prediction exceeds the threshold, at an operation 712, the server may determine whether the query prediction is associated with a link. If the server determines that the query prediction is not associated with a link, at an operation 714, the client device may receive a signal indicating no link was found. Operations 708 and 712 may be similar to operations 612 and 618, shown and described with reference to FIG. 6. Further, operations 710 and 714 may be similar to operations 512 and 516, shown and described with reference to FIG. 5, respectively.

If the server determines the launch application state exceeds the threshold, a query prediction exceeds the threshold, and/or a query prediction is associated with a link, at an operation 716, the client device may receive an identification of a link. With the identification of the link, the client device may identify the link to be displayed at a user interface of the client device if the user opens the map application. Upon receiving the identification, the client device may store it in a cache or other memory of the client device. In some implementations, the client device may receive more than one link identification. At an operation 718, the client device may determine whether the client device received a map application selection. The client device may determine if it received a map application selection within a predetermined time period, set by an administrator, of receiving the identification of the link. A map application selection may be a user or system input that causes the map application to execute on the client device. If the client device determines that it did not receive a map application selection, at an operation 720, the client device may discard the identification of the link. The client device may discard the identification of the link by removing it from the cache or other memory.

If the client device receives a map application selection, however, at an operation 722, the client device may execute the map application. The client device may execute the map application by processing the map application in memory. At an operation 724, the client device may display the link to the geographic location of the entity in a user interface associated with the map application. In some implementations, the client device may display the link in list form on the interface. The list may appear next to a map associated with the map application. The client device may display any number of links in the list. Further, in some implementations, the client device may display the links at various locations on the map associated with the user interface.

Advantageously, by receiving the identifications of links to be displayed prior to selection of a map application, the client device may be able to show the links quickly when the user selects the map application. Previous systems often require the client device to request such links to a server upon receipt of a selection of the map application and input into a query form associated with the map application. Method 700 may reduce the time it takes for users to view the links as they may already be stored on the client device when the user makes the selection.

In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's computing device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for low-latency provision of content, comprising:
   receiving, by a server from a client device, one or more signals indicating a current location of the client device;
   repeatedly predicting, by the server, whether a user will open a map application within a predetermined time period until a map application prediction exceeds a first threshold;
   before receiving an input query from the map application of the client device, retrieving, by the server from a database, characteristics of the client device;
   generating, by the server, a set of identifications, the set of identifications comprising the current location of the client device and the characteristics of the client device;
   predicting, by the server, a query using the set of identifications;
   after predicting that the user will open the map application within the predetermined time period, determining, by the server, that a query prediction exceeds a second threshold;
   responsive to the determination that the query prediction exceeds the second threshold selecting, by the server, a link to a geographic location of an entity that is associated with the query prediction; and
   responsive to the selection of the map application on the client device by the user, transmitting, by the server, the selected link to the client device before receiving a query from the user of the client device.

2. The method of claim 1, wherein the set of identifications further comprises previous locations of the client device and timestamps associated with the previous locations and the current location.

3. The method of claim 2, wherein predicting that the user will open the map application within the predetermined time period includes:
   comparing a first timestamp and a first previous location with a second timestamp and the current location; and
   determining a traveling speed based on the comparison.

4. The method of claim 2, wherein predicting that the user will open the map application within the predetermined time period includes:
   comparing a third timestamp and a third previous location with a fourth timestamp and the current location; and
   determining that the user has not moved within another time period based on the comparison.

5. The method of claim 1, wherein the characteristics comprise previously visited locations, previous searches, previous inputs corresponding to selection of a link to a geographic location, timestamps associated with the previous searches, a current time of day, or one or more queries associated with other client devices within another time period.

6. The method of claim 5, wherein determining that the query prediction exceeds the second threshold further comprises identifying that a correlation between one or more previous characteristics and one or more current characteristics exceeds a third threshold.

7. The method of claim 1, further comprising:
   receiving a user selection of the selected link; and
   increasing a prediction score associated with the selected link, responsive to receipt of the user selection of the selected link; and
   wherein the query prediction is proportional to the prediction score associated with the selected link.

8. A system for low-latency provision of content, comprising:
   a server comprising a network interface in communication with a client device and a processor;
   wherein the network interface is configured to:
   receive, from the client device, one or more signals indicating a current location of the client device;
   wherein the processor is configured to:
   repeatedly predict whether a user will open a map application within a predetermined time period until a map application prediction exceeds a first threshold;
   before receiving an input query from the map application, retrieve, from a database, characteristics of the client device;
   generate a set of identifications, the set of identifications comprising the current location of the client device and the characteristics of the client device;
   predict a query using the set of identifications;
   after predicting that the user will open the map application within the predetermined time period, determine that a query prediction exceeds a second threshold; and
   responsive to the determination that the query prediction exceeds the second threshold, select a link to a geographic location of an entity that is associated with the query prediction; and
   wherein the network interface is further configured to transmit the selected link to the client device before receiving a query from the user of the client device and responsive to the selection of the map application on the client device by the user.

9. The system of claim 8, wherein the set of identifications further comprises previous locations of the client device and timestamps associated with the previous locations and the current location.

10. The system of claim 9, wherein to predict that a user will open the map application within the predetermined time period, the processor is configured to:
    compare a first timestamp and a first previous location with a second timestamp and current location, and
    determine a traveling speed based on the comparison.

11. The system of claim 9, wherein to predict that a user will open the map application within the predetermined time period, the processor is configured to:
    compare a third timestamp and a third previous location with a fourth timestamp and the current location, and
    determine that the user has not moved within another time period based on the comparison.

12. The system of claim 8, wherein the characteristics comprise previously visited locations, previous searches, previous inputs corresponding to selection of a link, timestamps associated with the previous searches, a current time of day, or one or more queries associated with other client devices within time period.

13. The system of claim 12, wherein the processor is further configured to identify that a correlation between one or more previous characteristics and one or more current characteristics exceeds a third threshold.

14. The system of claim 8, wherein the processor is further configured to:
    receive a user selection of the selected link, and
    increase a prediction score associated with the selected link, responsive to receipt of the user selection of the selected link; and
    wherein the query prediction is proportional to the prediction score associated with the selected link.

\* \* \* \* \*